(12) United States Patent
Highleyman et al.

(10) Patent No.: US 7,194,488 B2
(45) Date of Patent: Mar. 20, 2007

(54) SPLIT PROCESSING SYSTEM FOR PROVIDING INCREASED SYSTEM AVAILABILITY

(75) Inventors: Wilbur H. Highleyman, Blairstown, NJ (US); Paul J. Holenstein, Downingtown, PA (US); Bruce D. Holenstein, Media, PA (US)

(73) Assignee: Gravic, Inc., Malvern, PA (US)

( * ) Notice: Subject to any disclaimer, the term of this patent is extended or adjusted under 35 U.S.C. 154(b) by 187 days.

(21) Appl. No.: 10/700,410

(22) Filed: Nov. 3, 2003

(65) Prior Publication Data

US 2004/0098411 A1 May 20, 2004

Related U.S. Application Data

(63) Continuation of application No. 10/368,315, filed on Feb. 13, 2003.

(60) Provisional application No. 60/411,720, filed on Sep. 17, 2002, provisional application No. 60/357,034, filed on Feb. 14, 2002.

(51) Int. Cl.
*G06F 17/30* (2006.01)

(52) U.S. Cl. ............... 707/202; 707/2; 707/103 Y; 714/1

(58) Field of Classification Search ............ 707/2, 707/8, 200, 201, 202, 203, 10, 101, 103 X–103 Z, 707/103 R; 714/1, 4, 11, 2
See application file for complete search history.

(56) References Cited

U.S. PATENT DOCUMENTS 4,628,508 A 12/1986 Sager et al.

(Continued)

OTHER PUBLICATIONS

Agesen et al., A Split Operator for Now-Relative Bitemporal Databases, Data Engineering, 2001. Proceedings, 17 International Conference on Apr. 2-6, 2001, pp. 41-50.*

(Continued)

*Primary Examiner*—Greta Robinson
(74) *Attorney, Agent, or Firm*—Akin Gump Strauss Hauer & Feld, LLP

(57) ABSTRACT

A split processing system is provided that has a plurality of nodes and a communication network. Each node includes one or more processors, or a processor subsystem including at least one processor and an operating system. Each node has a specific number of failure modes which is less than the number of failure modes in an unsplit system wherein all of the processors are located at a single node. The communication network allows the one or more processors at each of the nodes to interoperate with each other.

24 Claims, 23 Drawing Sheets

Node Splitting

U.S. PATENT DOCUMENTS

| | | | |
|---|---|---|---|
| 5,276,872 A * | 1/1994 | Lomet et al. | 707/202 |
| 5,625,815 A * | 4/1997 | Maier et al. | 707/8 |
| 5,790,776 A | 8/1998 | Sonnier et al. | |
| 5,838,894 A | 11/1998 | Horst et al. | |
| 6,122,630 A | 9/2000 | Strickler et al. | |
| 6,151,689 A | 11/2000 | Garcia et al. | |
| 6,233,702 B1 | 5/2001 | Horst et al. | |
| 6,260,068 B1 * | 7/2001 | Zalewski et al. | 709/226 |
| 6,415,297 B1 * | 7/2002 | Leymann et al. | 707/201 |
| 6,496,940 B1 | 12/2002 | Horst et al. | |
| 6,535,869 B1 * | 3/2003 | Housel, III | 707/2 |
| 6,606,626 B1 * | 8/2003 | Ponnekanti | 707/8 |
| 6,622,261 B1 | 9/2003 | Laranjeira et al. | |
| 6,665,811 B1 | 12/2003 | deAzevedo et al. | |
| 6,735,717 B1 | 5/2004 | Rostowfske et al. | |
| 2002/0133507 A1 | 9/2002 | Holenstein et al. | |

OTHER PUBLICATIONS

New, J. "NonStop NET/MASTER Tips and Techniques," Gresham Software Labs, reprint of article originally appearing in "The Tandem Connection," vol. 17, No. 6, Dec. 1996, printout from web site: http://www.greshamsoftwarelabs.com.au/main/download/nnm/tc172.pdf, 4 pages.

Krueger, J. "A Look at Fault Tolerance: Tandem NonStop Systems," Term paper: Operating System Design, Apr. 24, 1997, printout from web site: http://people.msoe.edu/~sebern/courses/cs384/papers97/krueger.pdf, 24 pages.

Cal, J. "Building Highly Available Database Servers Using Oracle Real Application Clusters," Copyright © 2001 Oracle Corporation, An Oracle White Paper, May 2001, printout from website: http://otn.oracle.com/products/oracle9i/pdf/high_avail_clusters.pdf, 16 pages.

Ghandeharizadeh, S. et al., "Parallel Databases and Decision Support Systems," Jun. 28, 2000, printout from website: http://www.autospaces.com/parallel.pdf, 5 pages.

* cited by examiner

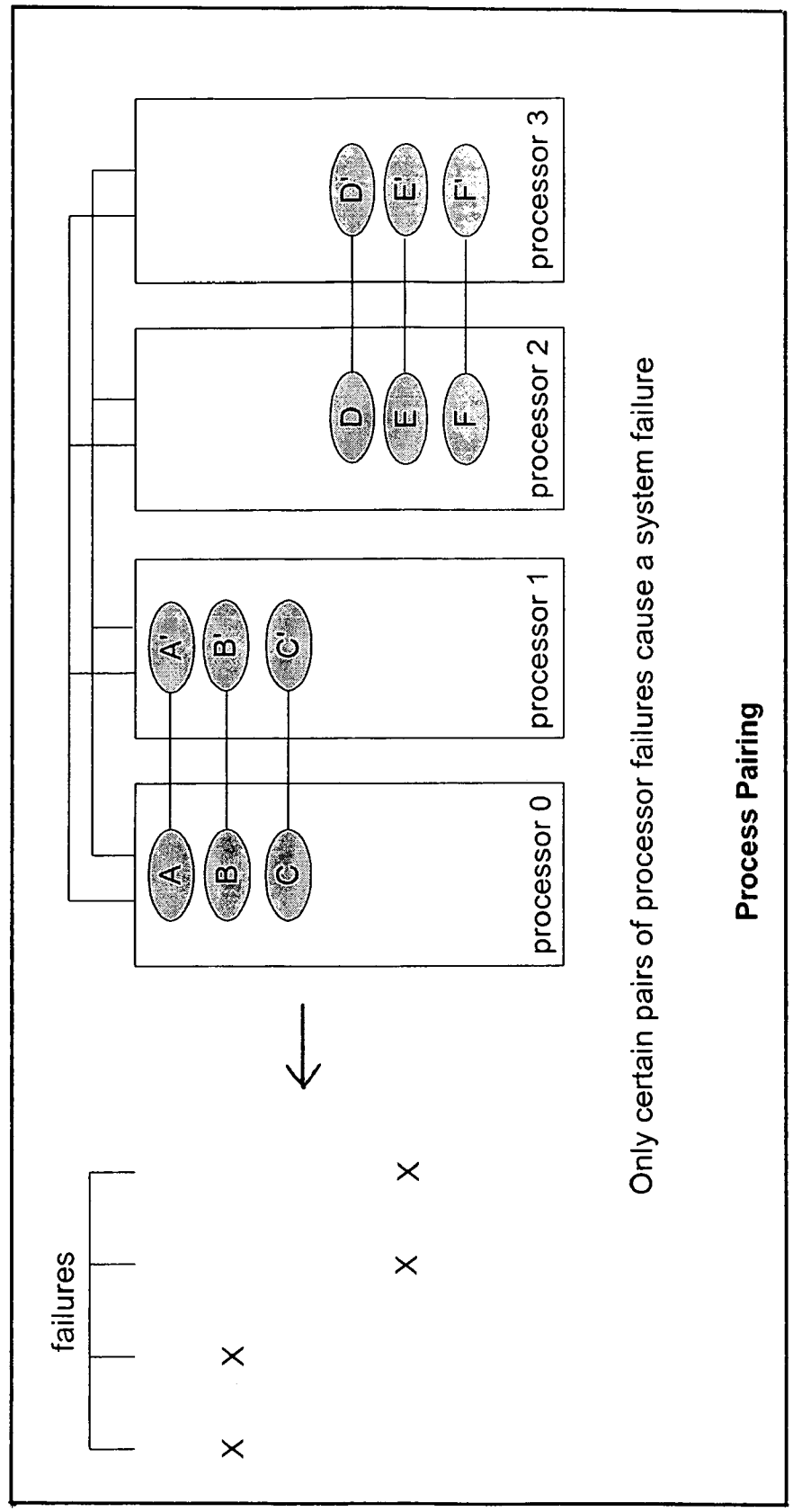

Failure Mode Impact on Availability

System Splitting

System Splitting with Capacity Enhancement

Node Splitting

System Splitting with Full Redundancy

Database on All Nodes

Partitioned Database

Split Mirrors with Multiple Storage Media

Splitting Mirrors

Networked Database

Dual Writes

Asynchronous Data Replication

Synchronous Data Replication

Distributed Network Storage

Fully Configured Split System

Processing Nodes Only

| n | i | comb (n,i) | mode probability | s | A | F | approx F | % error (approx F high if > 0) |
|---|---|---|---|---|---|---|---|---|
| 2 | 0 | 1 | 0.990025 | | | | | |
| 2 | 1 | 2 | 0.00995 | 0 | 0.990025 | 0.009975 | 0.01 | 0.25 |
| 2 | 2 | 1 | 0.000025 | 1 | 0.999975 | 0.000025 | 0.000025 | 0.00 |
| 4 | 0 | 1 | 0.980149501 | | | | | |
| 4 | 1 | 4 | 0.019701498 | 0 | 0.98015 | 0.019850499 | 0.02 | 0.75 |
| 4 | 2 | 6 | 0.000148504 | 1 | 0.999851 | 0.000149002 | 0.00015 | 0.67 |
| 4 | 3 | 4 | 4.975E-07 | 2 | 1 | 4.98125E-07 | 5E-07 | 0.38 |
| 4 | 4 | 1 | 6.25E-10 | 3 | 1 | 6.25E-10 | 6.25E-10 | 0.00 |
| 8 | 0 | 1 | 0.960693044 | | | | | |
| 8 | 1 | 8 | 0.038620626 | 0 | 0.960693 | 0.039306956 | 0.04 | 1.76 |
| 8 | 2 | 28 | 0.000679261 | 1 | 0.999314 | 0.000686131 | 0.0007 | 2.02 |
| 8 | 3 | 56 | 6.82674E-06 | 2 | 0.999993 | 6.8698E-06 | 7E-06 | 1.90 |
| 8 | 4 | 70 | 4.28815E-08 | 3 | 1 | 4.30544E-08 | 4.375E-08 | 1.62 |
| 8 | 5 | 56 | 1.72388E-10 | 4 | 1 | 1.72822E-10 | 1.75E-10 | 1.26 |
| 8 | 6 | 28 | 4.33136E-13 | 5 | 1 | 4.33758E-13 | 4.375E-13 | 0.86 |
| 8 | 7 | 8 | 6.21875E-16 | 6 | 1 | 6.22266E-16 | 6.25E-16 | 0.44 |
| 8 | 8 | 1 | 3.90625E-19 | 7 | 1 | 3.90625E-19 | 3.906E-19 | 0.00 |
| 16 | 0 | 1 | 0.922931124 | | | | | |
| 16 | 1 | 16 | 0.074205518 | 0 | 0.922931 | 0.077068576 | 0.08 | 3.80 |
| 16 | 2 | 120 | 0.00279669 | 1 | 0.997137 | 0.002863359 | 0.003 | 4.77 |
| 16 | 3 | 560 | 6.5584E-05 | 2 | 0.999933 | 6.66682E-05 | 7E-05 | 5.00 |
| 16 | 4 | 1820 | 1.07311E-06 | 3 | 0.999999 | 1.08413E-06 | 1.138E-06 | 4.92 |
| 16 | 5 | 4368 | 1.29177E-08 | 4 | 1 | 1.30376E-08 | 1.365E-08 | 4.70 |
| 16 | 6 | 8008 | 1.19008E-10 | 5 | 1 | 1.19867E-10 | 1.251E-10 | 4.39 |
| 16 | 7 | 11440 | 8.54326E-13 | 6 | 1 | 8.59178E-13 | 8.935E-13 | 4.02 |
| 16 | 8 | 12870 | 4.82973E-15 | 7 | 1 | 4.85138E-15 | 5.027E-15 | 3.63 |
| 16 | 9 | 11440 | 2.15734E-17 | 8 | 1 | 2.16494E-17 | 2.234E-17 | 3.21 |
| 16 | 10 | 8008 | 7.58962E-20 | 9 | 1 | 7.60946E-20 | 7.82E-20 | 2.77 |
| 16 | 11 | 4368 | 2.08002E-22 | 10 | 1 | 2.08438E-22 | 2.133E-22 | 2.32 |
| 16 | 12 | 1820 | 4.35516E-25 | 11 | 1 | 4.3619E-25 | 4.443E-25 | 1.87 |
| 16 | 13 | 560 | 6.73391E-28 | 12 | 1 | 6.74117E-28 | 6.836E-28 | 1.41 |
| 16 | 14 | 120 | 7.25116E-31 | 13 | 1 | 7.25602E-31 | 7.324E-31 | 0.94 |
| 16 | 15 | 16 | 4.8584E-34 | 14 | 1 | 4.85992E-34 | 4.883E-34 | 0.47 |
| 16 | 16 | 1 | 1.52588E-37 | 15 | 1 | 1.52588E-37 | 1.526E-37 | 0.00 |

Availability Approximation (a = .995)

Table A-1

Figure 16

SPLIT PROCESSING SYSTEM FOR PROVIDING INCREASED SYSTEM AVAILABILITY

CROSS-REFERENCE TO RELATED APPLICATIONS

This application is a continuation of U.S. application Ser. No. 10/368,315 filed Feb. 13, 2003, the entire disclosure of which is incorporated herein by reference. This application claims the benefit of U.S. Provisional Application Nos. 60/357,034 filed Feb. 14, 2002, and 60/411,720 filed Sep. 17, 2002.

BACKGROUND OF THE INVENTION

A. System Availability

As individuals and companies become more dependent upon computers in their daily lives, the reliability of these systems becomes even more important. There are several metrics that can be used to characterize reliability. The most common are:

1. Mean time before failure (MTBF)—The average time that a system will be operational before it fails.
2. Mean time to repair (MTR)—The average time that it takes to restore a failed system to service.
3. Availability (A)—The proportion of time (or the probability) that the system will be operational.

These metrics are simply related by $$A = \frac{MTBF}{MTBF + MTR} \quad (1)$$

That is, A is the proportion of total time (MTBF+MTR) that the system is operational (MTBF). (1–A) is therefore the proportion of time that the system will be down. For instance, if the system is operational for an average time of 4000 hours (MTBF=4000) and requires 2 hours for repair (MTR=2), then A=4000/4002=0.9995. That is, the system is expected to be operational 99.95% of the time, and will be out of service 0.05% of the time.

High availabilities are more easily described in terms of their "9s." For instance, a system with an availability of 99.9% is said to have an availability of three 9s. A system with an availability of 99.998% is said to have an availability of a little less than five 9s, and so forth.

The number of 9s are related to down time as follows:

TABLE 1

9s and Down Time

| Nines | % Available | Hours/Year | Minutes/Month |
|---|---|---|---|
| 2 | 99% | 87.6 | 438 |
| 3 | 99.9% | 8.76 | 44 |
| 4 | 99.99% | .88 | 4.4 |
| 5 | 99.999% | .09 | .44 |
| 6 | 99.9999% | .01 | .04 |

Windows® NT servers are now reporting two 9s or better. Most high-end UNIX servers are striving for three 9s, while HP NonStop® Servers and IBM Sysplex® systems are achieving four 9s.

These concepts are further described in Highleyman, W. et al., "Availability," Parts 1 through 5, *The Connection*, Volume 23 No. 6 through Volume 24, No. 4, 2002, 2003.

B. System MTBF

From Equation (1), the system mean time before failure, MTBF, can be expressed as a function of A:

$$MTBF = \frac{A}{1-A} MTR$$

Since A is typically very close to one, MTBF can be closely approximated by $$MTBF \approx \frac{MTR}{1-A} \quad (2)$$

The system mean time to repair, MTR, is usually a function of service agreements and repair capability and can be considered fixed. Therefore, MTBF is inversely proportional to the quantity (1–A) which is the probability of system failure. If the probability of failure can be cut in half, the system's mean time before failure can be doubled.

C. Current High-Availability Architectures

The most reliable systems such as the HP NonStop Servers achieve their high reliability by "n+1 sparing." That is, every critical component is replicated n+1 times, and can function unimpeded (except for perhaps its processing capacity) if at least n instances of a critical component are functioning. That is, such a system can tolerate any single failure and continue in operation. However, more than one failure can potentially (though not necessarily) cause the system to fail. Critical components include processors, disks, communication lines, power supplies and power sources, fans, and critical software programs (referred to as processes hereafter).

These systems can achieve availabilities in the order of four 9s.

D. Replicating Systems for Availability

As can be seen from Table 1 above, a system with an availability of four 9s can be expected to be down almost an hour a year. In cases where this amount of down time is unacceptable, the systems may be replicated. That is, a hot standby is provided. The active system provides all of the processing for the application and maintains a nearly exact copy of its current database on the standby system. If the active system fails, the standby system can (almost) immediately assume the processing load.

It can be shown that replicating a system (e.g., adding a node with $n_p$ processors thereby causing the system to go to $2n_p$ processors as in a disaster recovery scenario) doubles its 9s. Thus, for instance, one could build a replicated system from two UNIX systems, each with three 9s availability (8.8 hours downtime per year) to achieve an overall system availability of six 9s (32 seconds downtime per year).

E. What is Needed

For many applications, downtimes in the order of hours per year are unacceptable or even intolerable. The cost of downtime can range from $1,000 per hour to over $100,000 per hour. If a Web store is down often, customers will get aggravated and go to another Web site. If this happens enough, lost sales will quickly turn into lost customers.

If a major stock exchange is down for just a few minutes, it will make the newspapers. If a 911 system is down for a few minutes, the result could be the loss of life due to a cardiac arrest or a building destroyed by fire. The cost of a few seconds of down time in an in-hospital patient monitoring system could be measured in lives rather than in dollars.

Replicating systems as described above can dramatically improve system availability. However, some of these systems are quite expensive, costing millions of dollars. To provide a standby system costing this much is often simply not financially feasible.

What is needed is a method for substantially achieving the availability of a replicated system at little if any additional cost. The present invention fulfills such a need.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown. In the drawings:

FIG. 2 shows system failure modes in a four-processor system that uses process pairs in accordance with one preferred embodiment of the present invention;

FIG. 16 is a table showing availability approximation.

BRIEF SUMMARY OF THE INVENTION

Figure 1:
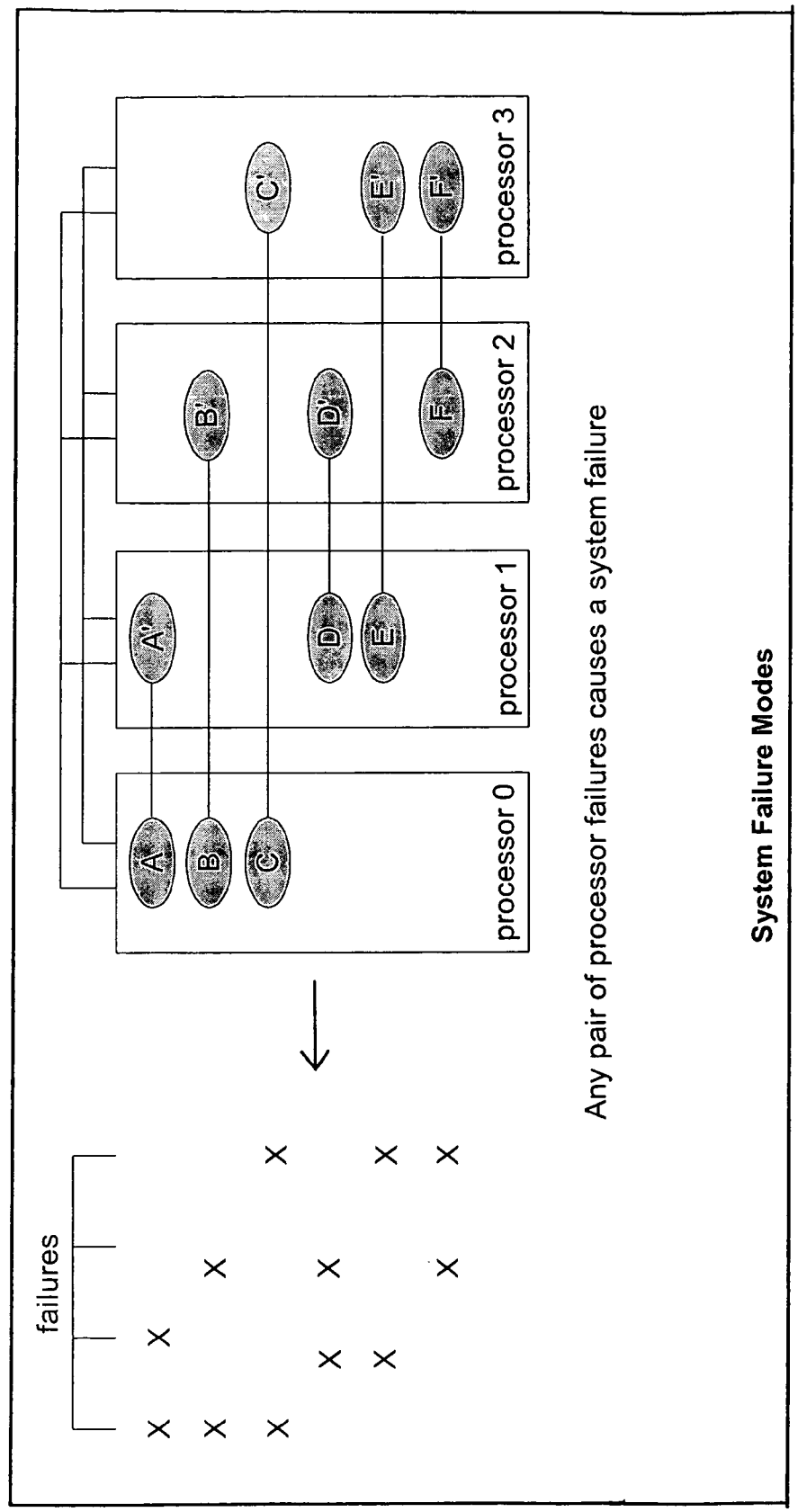
FIG. 1 shows system failure modes in a four-processor system wherein multiple critical process pairs are distributed randomly among the processors.

A split processing system is provided that comprises a plurality of nodes and a communication network. In one embodiment of the present invention, each node includes one or more processors. In another embodiment of the present invention, each node includes a processor subsystem including at least one processor, and an operating system. In both embodiments, each node has a specific number of failure modes which is less than the number of failure modes in an unsplit system wherein all of the processors are located at a single node. The communication network allows the one or more processors at each of the nodes to interoperate with each other.

DETAILED DESCRIPTION OF THE INVENTION

Certain terminology is used herein for convenience only and is not to be taken as a limitation on the present invention. In the drawings, the same reference letters are employed for designating the same elements throughout the several figures.

APPENDIX

Availability Approximations
Table of Contents for Detailed Description

1. Introduction
2. State of the Art
3. What Is Needed
4. Definitions
5. Failure Modes
    5.1 Single Sparing
    5.2 Process Pairing
    5.3 Multiple Sparing APPENDIX-continued Availability Approximations
Table of Contents for Detailed Description 5.4 Process Tupling
    5.5 Comparison of Architectures
    5.6 Approximations
  6. Increasing System Availability
  7. Decreasing Failure Modes by Judicial Process Allocation
  8. Decreasing Failure Modes By System Splitting
    8.1 Failure Mode Reductions
    8.2 Replicating the Database
        8.2.1 Database Copy at Each Node
        8.2.2 Database Replication Cost
        8.2.3 Partitioned Database
        8.2.4 Split Mirrors
        8.2.5 Network Storage
        8.2.6 Multiple Sparing
    8.3 Replicating Data
        8.3.1 Dual Writes
        8.3.2 Asynchronous Data Replication
        8.3.3 Synchronous Data Replication
    8.4 Disaster Recovery
    8.5 The Communication Network
    8.6 Performance
    8.7 Implementations
        8.7.1 Full Database on Each Node
        8.7.2 Partitioned Database
        8.7.3 Split Mirrors
        8.7.4 Network Storage
        8.7.5 Distributed Network Storage
        8.7.6 Other Configurations 1. Introduction A detailed discussion of the preferred embodiments of the present invention follows below.

2. State of the Art

See the discussion above in the Background of the Invention.

3. What Is Needed

See the discussion above in the Background of the Invention

4. Definitions

The following definitions are provided to promote understanding of the invention.

processor—a device comprising a central processing unit (CPU), usually having memory, and the ability to communicate with other elements.

processor subsystem—a processor subsystem includes at least one processor. Prior to system splitting, a processor subsystem includes a plurality of processors ($n_p$).

program—a set of computer instructions (also known as "code") that will cause a processor to execute a particular function.

code—the set of instructions that create a program.

process (or process instance)—a program running in a processor.

application—a process which executes a user-defined function.

active process (or primary process)—a process which is prepared to receive input data and to execute its functions on that data. There may be more than one active instance of a particular process running in a processor or in a group of interconnected processors.

standby process (or backup process or secondary process)—a process which is ready to become active if an active process fails. An active process may fail because of a defect in its code, or because the processor in which it is running fails. There may be more than one standby instance of a particular process running in a processor or in a group of interconnected processors.

storage device—a device or location to store data. The data may be stored on disk drives, as well as on memory in or accessible to the processor, or in a combination of the two. Examples of storage devices include disk units and processor memory (e.g., a memory-resident storage device).

database (or database instance)—One or more attributes, files, and/or tables stored on one or more storage devices of one or more types of media.

processing node—a location in a network that includes a grouping of elements including one or more processors and one or more applications, with no database.

database node—a location in a network that includes one or more databases but with no applications.

database processing node—a location in a network that includes a grouping of elements including one or more processors, one or more databases, and one or more applications.

communication network (or network)—structure which allows two or more nodes of any type to interoperate with each other. When there are plural nodes in a network, one or more of the nodes can be collocated (co-located) at the same, or different physical locations.

replication—the communication of updates made to one database in a system to other databases in the system over a communication network so that those databases may be similarly updated.

fault—a lurking incorrectness waiting to strike. It may be a hardware or software design error, a hardware component failure, a software coding error, or even a bit of human ignorance (such as an operator's confusion over the effects of a given command).

failure—the exercise of a fault by a hardware or software element that causes that element to fail.

system outage—the inability of a system to perform its required functions according to some pre-defined level of service. In some systems, any failure of a system element may cause a system outage. In other systems, the system can survive the failure of one or more of its elements.

failure mode—a unique set of failures that will cause a system outage.

5. Failure Modes

Before exploring means for achieving the goal set forth in Section 3 above, it is important to understand the role that "failure modes" play in system reliability.

5.1 Single Sparing

As an example, consider the four-processor system shown in FIG. 1. The processors can communicate with each other over a dual interprocessor bus, and are otherwise configured so that no single hardware failure will compromise the operation of the system. For instance, though not shown, each disk unit and each communication line controller is connected to at least two different processors so that, if one processor fails, another processor can provide a path to these disks and communication lines.

However, critical software modules, or processes, are often provided only in pairs (for example, processes A/A', B/B', and so forth in FIG. 1). A critical process is one that is required in order that the system be operational. Each process of a critical process pair typically runs in a different processor (assignment of the standby is generally to another processor to provide a processor "spare"). One of these processes is typically the active process and handles all of the processing functions for the process pair. The other process is typically a "standby" process that monitors the primary and is prepared to take over all processing functions if the active process fails, perhaps due to the failure of the processor in which the active process is running.

The scope of the present invention is meant to cover additional implementations as well, including those where all of the process pairs (and/or all of the spares) are "active", sharing in processing the workload, as well as those where some processes are active and others are standby.

Thus, the system shown in FIG. 1 will survive the failure of any single processor. However, if two processors fail, and if those two processors contain the active and standby processes of a critical process pair, then the system will fail.

In FIG. 1, multiple critical process pairs are distributed randomly among the processors such that the failure of any pair of processors will cause the failure of a critical process pair and thus the failure of the system. There are six different ways that two out of four processors can fail. Each of these are called a "failure mode." Thus, this four-processor system has six failure modes.

Let a represent the availability of one of the processors. That is, a is the probability that a particular processor will be operational. Then (1−a) is the probability that that processor will be non-operational, or failed.

The probability that two processors will be non-operational is the probability that one will be failed and that the other will be failed, or $(1-a)(1-a)=(1-a)^2$. That is, $(1-a)^2$ is the probability that a particular pair of processors will be failed and that the system will be down. (This is an approximation. The validity of this approximation is evaluated in Section 5.6 and Attachment 1.) Since there are six different ways that this can happen (six failure modes), then the probability that any two processors will be down, thus causing a system failure, is $6(1-a)^2$. This is the probability that the system will be down. The probability that the system will be operational is one minus the probability that it will be down, or $[1-6(1-a)^2]$. This is the system availability A:

$$A \approx 1-6(1-a)^2.$$

for FIG. 1

This is an example of the more general case in which the system has f failure modes. In general, if there are f failure modes, and each can happen with a probability of $(1-a)^2$ (a dual processor failure), then the probability of a system failure is $f(1-a)^2$, and the system availability is $$A \approx 1-f(1-a)^2 \quad (3)$$

5.2 Process Pairing

A dual processor failure does not necessarily cause a system failure. For instance, consider FIG. 2 in which the processes in the four-processor system of FIG. 1 are configured differently. In FIG. 2, the critical process pairs are not distributed randomly amongst the processors. Rather, the processors are organized into two pairs of processors. Each critical process pair is assigned to one of the processor pairs, and does not span processor pairs.

In this case, the system will fail only if processors 0 and 1 fail, or if processors 2 and 3 fail. Thus, this configuration has only two failure modes (f=2) and the system availability becomes $$A \approx 1-2(1-a)^2$$

for FIG. 2

The paired system of FIG. 2 will experience one-third of the downtime as that of FIG. 1. This may be expressed as being three times more reliable.

The worst case for failure modes is the random distribution of processes as shown in FIG. 1. For a system containing n processors, the maximum number of failure modes can be deduced as follows. Initially, any one of n processors can fail. Given that one processor has failed, there are left (n−1) processors which could provide the second failure. Thus, there are n(n−1) ways in which two processors may fail. However, each failure mode has been counted twice. For instance, the failure of processor 5 was counted followed by processor 3, as well as the failure of processor 3 followed by processor 5. Thus, the count of n(n−1) must be divided by two, and the maximum number of failure modes, $f_{max}$, for n processors is $$f_{max} = \frac{n(n-1)}{2} \text{ (single spare)} \quad (4)$$

For the case of FIG. 1, n=4. Therefore, $f_{max}$, the maximum number of failure modes is 4×3/2=6, as shown in FIG. 1.

5.3 Multiple Sparing

Up to now, only systems with a single spare have been considered. The system will survive the failure of any single component, but may not survive the failure of two or more components.

The example systems of FIGS. 1 and 2 are single-spared because the critical processes are run only as process pairs and therefore provide only a single spare. However, the hardware may not be so limited. For instance, the architecture of the HP S-Series NonStop Servers divorces the processors from the disk units and communication controllers. Each of these components is self-standing and is interconnected to all other components by a high speed redundant "fabric" called ServerNet®. Thus, no matter how many processors may fail, the remaining processors still have access to all of the system's peripheral devices and to each other.

The critical processes can be configured to take advantage of this higher level of sparing. That is, a primary critical process running in one processor can have two or more standby processes running in other processors. Taken to the extreme, there can be one (or more) standby processes in each of the available processors in the system, including the processor running the primary process.

Moreover, there may be multiple instances of a primary process running in one or more processors, and multiple instances of standby processes running in the same processors as the primary processes as well as in other processors. For instance, if there are n processors in the system, a process may have a spare in each of the n processors plus an active copy running in one processor. If the active process fails, then the standby process running in its processor could take over its functions, and would still have n−1 processes to back it up.

Figure 3A:
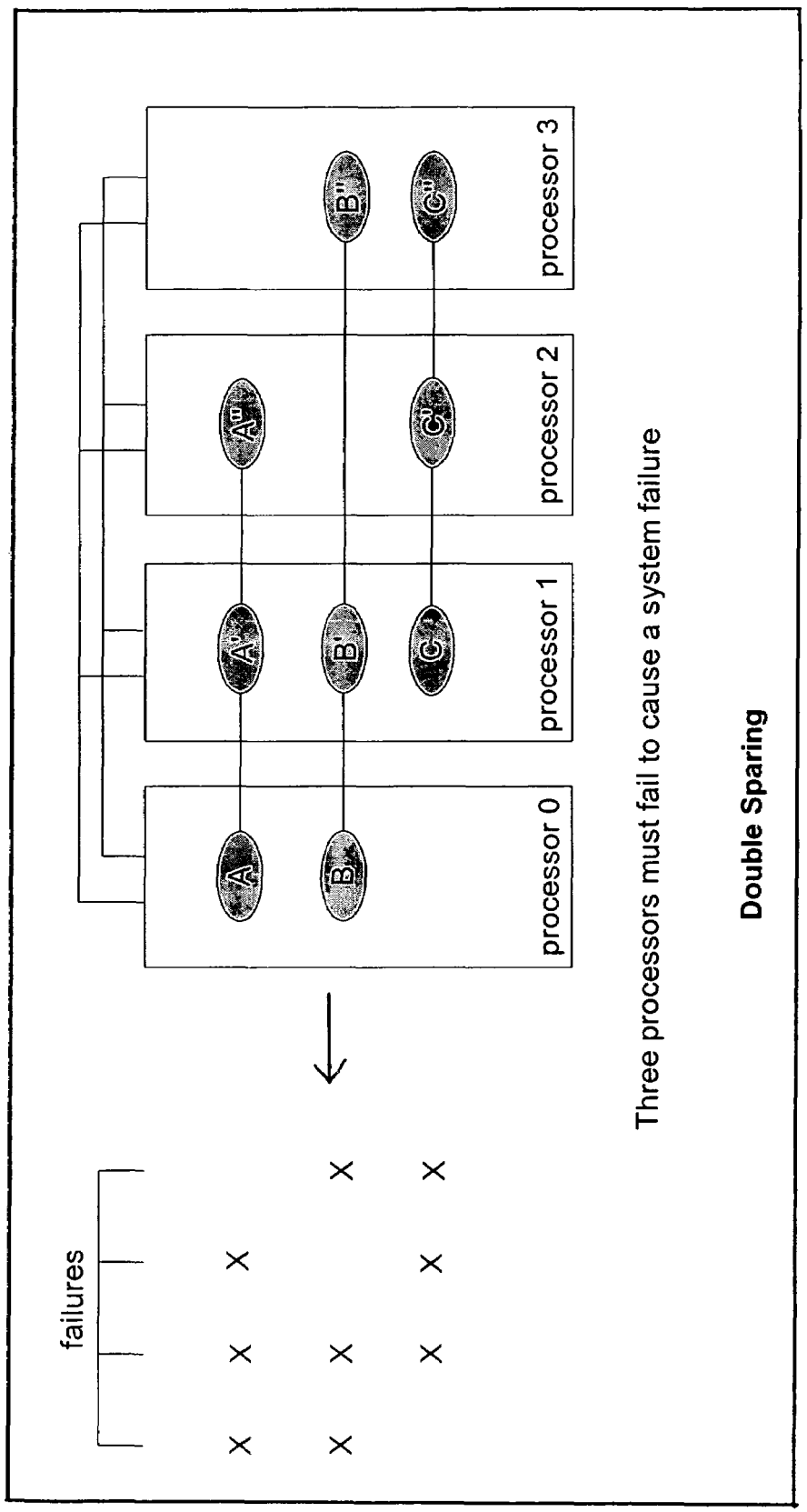
FIG. 3a shows system failure modes in a four-processor system that uses double sparing in accordance with one preferred embodiment of the present invention.

FIG. 3a shows critical processes each backed up by two spares (for instance, critical process A with its spares A' and A"). In this case, there are three failure modes among the four processors that will cause a system outage.

Represent the number of spares by s. In FIGS. 1 and 2, there was only one spare, so s=1. In FIG. 3a, there are two spares, so s=2. In general, in order for the system to fail, (s+1) processors must fail. Following the analysis above, the probability that (s+1) processors will fail is $(1-a)^{s+1}$, and the system availability is $$A \approx 1-f(1-a)^{s+1} \quad (5)$$

The processor availability a is typically very close to one (greater than 0.99).

Therefore, the probability of a processor failure, (1−a), is very small (typically less than 0.01). By adding a spare, the probability of system failure is reduced by the very small multiplicative factor (1−a). Thus, adding a spare dramatically improves reliability.

The maximum number of failure modes is now the number of ways in which (s+1) processors can be chosen from n processors. This can be shown to be $$f_{max} = \frac{n!}{(n-s-1)!(s+1)!} \quad (s \text{ spares}) \quad (6)$$

where the "!" notation means factorial. For instance, 4!=4×3×2×1=24.

For s=1 (the single spare case), Equation (6) reduces to Equation (4).

The values for $f_{max}$ for different size systems (up to 16 processors) using different sparing levels are shown in Table 2.

TABLE 2

Failure Modes for n processors with s spares

| Spares (s) | Processors (n) | | | | | | |
|---|---|---|---|---|---|---|---|
| | 2 | 4 | 6 | 8 | 10 | 12 | 14 | 16 |
| 0 | 2 | 4 | 6 | 8 | 10 | 12 | 14 | 16 |
| 1 | 1 | 6 | 15 | 28 | 45 | 66 | 91 | 120 |
| 2 | | 4 | 20 | 56 | 120 | 220 | 364 | 560 |
| 3 | | 1 | 15 | 70 | 210 | 495 | 1001 | 1820 |
| 4 | | | 6 | 56 | 252 | 792 | 2002 | 4368 |
| 5 | | | 1 | 28 | 210 | 924 | 3003 | 8008 |
| 6 | | | | 8 | 120 | 792 | 3432 | 11440 |
| 7 | | | | 1 | 45 | 495 | 3003 | 12870 |
| 8 | | | | | 10 | 220 | 2002 | 11440 |
| 9 | | | | | 1 | 66 | 1001 | 8008 |
| 10 | | | | | | 12 | 364 | 4368 |
| 11 | | | | | | 1 | 91 | 1820 |
| 12 | | | | | | | 14 | 560 |
| 13 | | | | | | | 1 | 120 |
| 14 | | | | | | | | 16 |
| 15 | | | | | | | | 1 |

5.4 Process Tupling

The concept of process pairing for single-spared processes can be extended to processes with multiple spares. A set of processes comprising two or more instances will be called a process tuple.

Consider a system with six processors, and with each critical process configured with two spares. Thus, each critical process tuple comprises three processes—one active process and two standby processes. If these process tuples were to be randomly distributed across all six processors, Table 2 shows that there would be twenty failure modes. That is, there are twenty different ways in which three processors out of six could fail that would take a critical process down and thus cause a system failure.

Figure 3B:
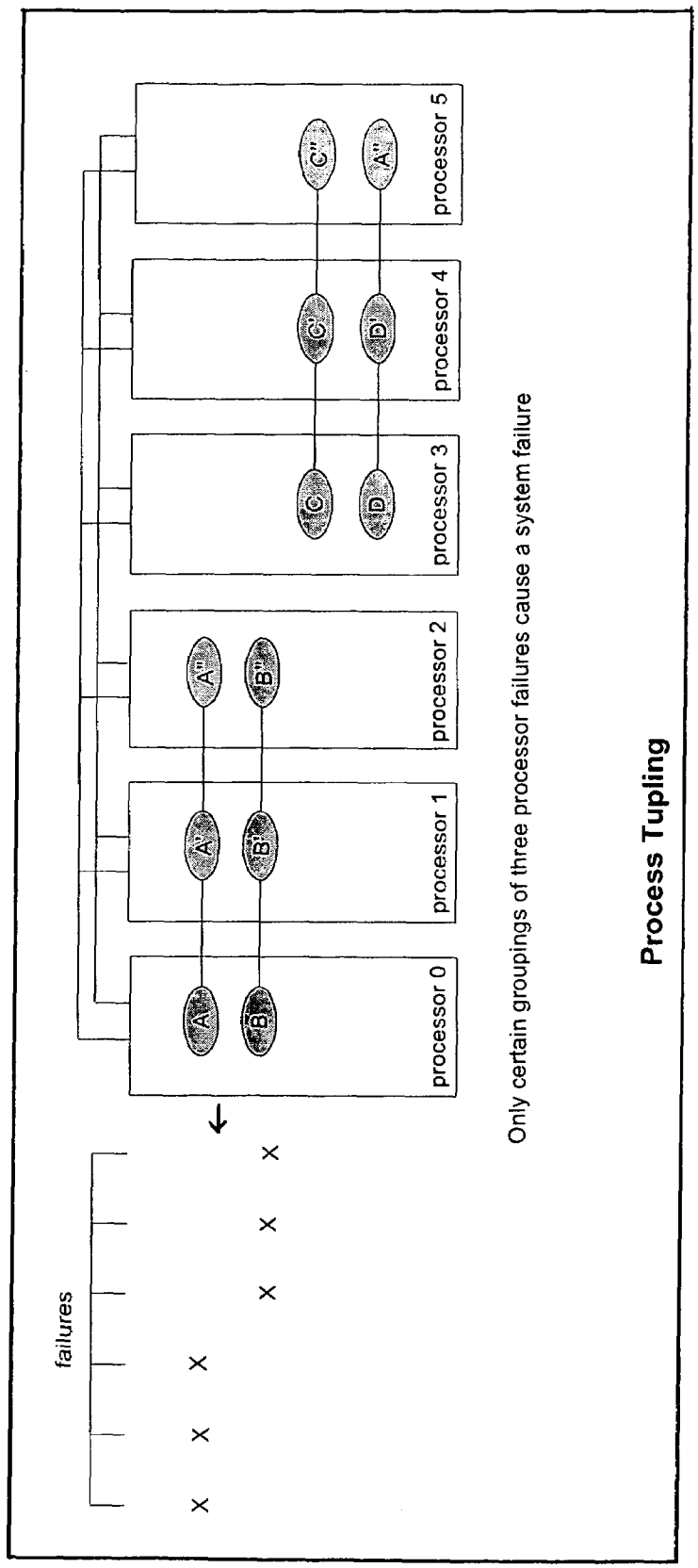
FIG. 3b shows system failure modes in a six-processor system that uses process tupling in accordance with one preferred embodiment of the present invention.

However, if the processors themselves were arranged in tuples of three as shown in FIG. 3b, and if each process tuple were assigned to a processor tuple and not allowed to span multiple processor tuples, then the number of failure modes is reduced from twenty to two. Either processors 0, 1, and 2 must fail, or processors 3, 4, and 5 must fail in order to cause a system failure. Thus, by simply configuring process allocation to obey process tupling, the reliability of the system has been increased by a factor of ten.

5.5 Comparison of Architectures

Table 3 gives some examples of the architectures described above. This table is for the case of an eight-processor system in which each processor has an availability of 0.995 (a=0.995). It is seen that paired distribution of processes (FIG. 2) is seven times more reliable than random process distribution since the failure modes have been reduced by a factor of seven (from 28 to 4). Adding a second spare to the random distribution case increases the number of failure modes to 56 but dramatically decreases the expected down time from over six hours per year to less than four minutes per year. This is due to the reduced probability of losing three processors simultaneously. Adding a third spare and using a tupled configuration reduces the probability of failure to almost zero (40 milliseconds per year).

TALE 3

Process Allocation Examples

| | n | s | A | f | Downtime/year |
|---|---|---|---|---|---|
| One spare, random | 8 | 1 | .9993 | 28 | 6.13 hours |
| One spare, paired | 8 | 1 | .9999 | 4 | .88 hours |
| Two spares, random | 8 | 2 | .999993 | 56 | 3.7 minutes |
| Two spares, tupled | 8 | 2 | .9999993 | 2 | 7.9 seconds |
| Three spares, random | 8 | 3 | 7 9s | 70 | 1.4 seconds |
| Three spares, tupled | 8 | 3 | 9 9s | 2 | .04 seconds |

Figure 4:
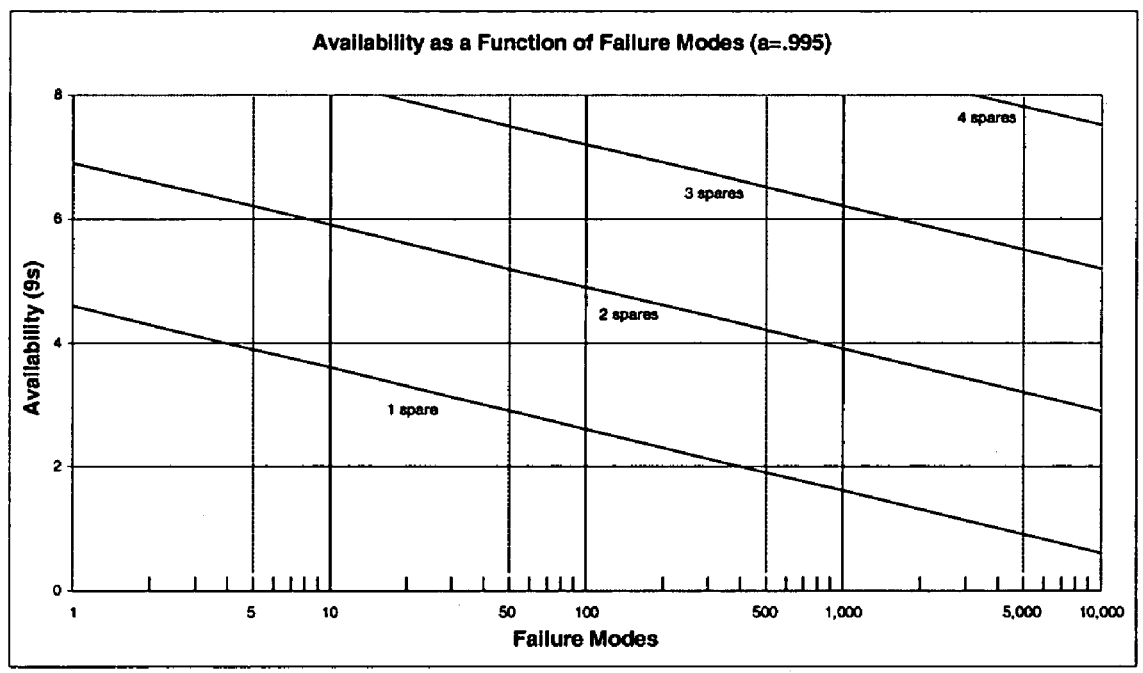
FIG. 4 shows a graph that illustrates failure mode impact on availability.

A more general comparison of the impact of failure modes and sparing is given in FIG. 4 for a=0.995. This is a chart in which the ordinate represents the system availability in terms of 9s, and the abscissa represents the number of failure modes (on a logarithmic scale). Curves for one through four spares are shown. The results of Table 2 can be found also by using this chart.

5.6 Approximations

Equations (3) and (5) use the "approximately equals" sign "≈" rather than the "equals" sign "=." This is because this simplified analysis considers only the case for (s+1) failures. It is at this point that the system is considered to be in failure. However, it is also possible to have more than (s+1) failures. For instance, in a system configured for single sparing, it is possible that three, four, or more processors might fail. A more accurate analysis would take this into account. However, the more complex equations would obscure the impact of failure modes and sparing.

The probability of these extended failure modes is very small provided that the processor availability a is close to one. In fact, for a value of a=0.995, the error is 5% or less over a range of systems from 2 to 16 processors as shown in the Appendix.

6. Increasing System Availability

Equation (5) shows that system availability is given by $$A \approx 1 - f(1-a)^{s+1}$$

Therefore, it is evident that system availability is controlled by three factors:

a—the subsystem (processor) availability
s—the number of spares
f—the number of failure modes System availability can be increased if a or s can be increased, or if f can be decreased.

The subsystem availability, a, is generally not under control of the system implementer, the user, or the subsystem user. It is a function of the quality of the product (MTBF) purchased from the computer vendor and the service policies (MTR) of the vendor.

The number of spares, s, is also not generally under control of the system implementer, the user, or the subsystem user, as this is a function of the hardware and software configuration supplied by the vendor. Most highly reliable systems today are single-spared (s=1) especially with regard to their software components. Application programs can be created which are multi-spared, but they won't add much to system reliability if all of the critical processes supplied by the vendor are single-spared.

It is the number of failure modes that can be controlled. If the number of failure modes can be reduced, the reliability of the system can be correspondingly increased.

More to the point, the probability of a system failure is given by $f(1-a)^{s+1}$ and is directly proportional to the number of failure modes, $f$. Equation (2) shows that system MTBF is inversely proportional to the probability of system failure and therefore to the number of failure modes. Thus, for instance, if $f$ can be cut in half, the system MTBF doubles.

7. Decreasing Failure Modes by Judicial Process Allocation

As demonstrated in FIGS. 1 and 2, the strategy used to allocate processes to processors can have a dramatic effect on availability. If processes are randomly allocated to processors as shown in FIG. 1, then the number of failure modes is, from Equation (4), $n(n-1)/2$.

However, if processors are paired and process pairs are only allocated to processor pairs as shown in FIG. 2, then the number of failure modes is only $n/2$.

Taking the ratio of these two values, it is seen that reliability is improved by a factor of $(n-1)$ if process pairs in an n-processor system are allocated to processor pairs rather than randomly distributed. For a 16-processor system, down time will be reduced by a factor of 15 if process pairs are allocated to processor pairs rather than being randomly distributed. Specifically, the number of failure modes is reduced from 120 to 8.

Therefore, as pointed out in section B of the Background of the Invention, if a 16-processor system with random process allocation has an MTBF of five years, then processor pairing will increase its MTBF to 75 years.

Of course, the minimum number of failure modes is one. This can be achieved by running all critical process pairs in one processor pair. This is often precluded for performance reasons—one pair of processors may not be able to handle the load imposed by all critical processes, especially if one processor fails.

In general, then, the number of failure modes in a system will range from one through $n(n-1)/2$. Minimizing these failure modes is key to increasing system availability. Processor pairing as described above and as shown in FIG. 2 is a powerful method to achieve this, leading to a reliability improvement by a factor of $(n-1)$ for an n-processor system when compared to random process allocation.

8. Decreasing Failure Modes By System Splitting

The fact that smaller systems have fewer failure modes can be used to great advantage to dramatically increase the availability of the system. As shown next, if a single system is split into several independent but cooperating nodes, the number of failure modes is reduced. In fact, in the most conservative case in which the system cannot withstand the loss of a single node due to level of service considerations, if the system is split into k independent but cooperating nodes, the number of failure modes for the system is reduced by more than a factor of k. This has the impact of increasing the system's mean time before failure by more than a factor of k.

Additionally, if the system can withstand the loss of one or more nodes and still provide acceptable service, availability can be dramatically increased by system splitting. This is because each of the nodes represents a spare subsystem that can provide full application functionality (in other words, the application or some portion thereof has been "split", or duplicated, across the nodes).

If the system is split into k nodes that are each fully functional, and m of these nodes must be operational in order for the system to be functional, then in effect the system has been provided with $s=k-m$ spares. That is, it would take $k-m+1$ nodal failures to deprive the users of all processing functionality.

Thus, as discussed in Section 6 relative to Equation (5), splitting a system into several independent but cooperating nodes not only decreases the number of failure modes, $f$, but may also increase the number of spares, s. These effects join together to provide dramatically increased system availability and mean time before failure.

This result holds whether all nodes are active nodes providing processing capacity for the system or whether some nodes are passive nodes and provide active processing capacity only after some other active node fails.

8.1 Failure Mode Reductions

As shown above, increasing the system size will exponentially increase the number of failure modes. For instance, with a single spare, Equation (4) indicates that the maximum number of failure modes increases approximately as the square of the system size.

Even worse, if the system is configured for multiple spares, the maximum number of failure modes increases exponentially with system size according to the power of $(s+1)$ (see Equation (6)). For instance, for two spares, the maximum number of failure modes is $n(n-1)(n-2)/6$. The maximum number of failure modes increases approximately as the cube of the system size. This relationship can be verified by reference to Table 2.

Figure 5A:
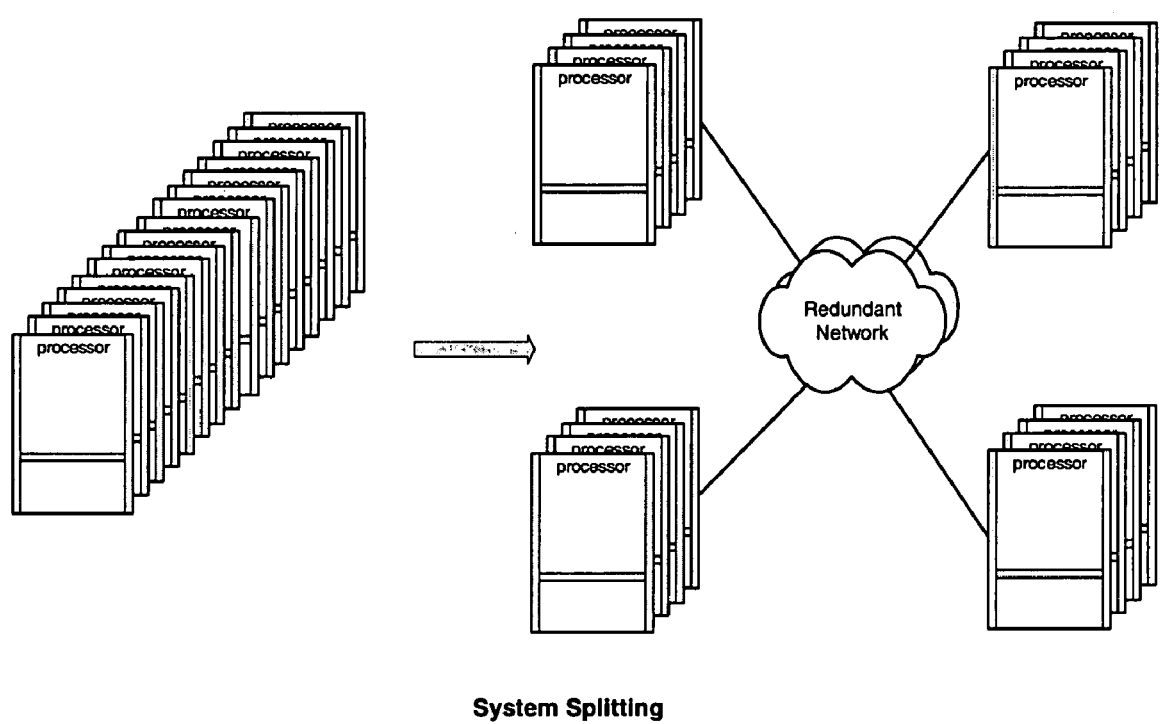
FIG. 5a shows a 16-processor system split into four 4-processor nodes and illustrates one system splitting approach in accordance with one preferred embodiment of the present invention.

This relationship can be used to advantage to reduce failure modes by splitting the system into several smaller independent systems, or nodes, cooperating over a communication network to provide the full processing capacity of the original system as shown in FIG. 5*a*. As an example, consider the case of single-spared systems as most commonly used in the prior art.

It will also be assumed that the failure of a single node is considered to be a failure of the system. This may be overly conservative since the remaining nodes are still operational and can continue to provide service.

Using FIG. 5*a* as an example, a 16-processor system is shown split into four 4-processor nodes. Each node is an independent stand-alone system capable of handling 25% of the processing load. However the scope of the present invention is meant to cover other splitting algorithms, including non-uniform load assignments.

The 16-processor system can have up to $16 \times 15/2 = 120$ failure modes (from Equation (4) or Table 2). Each of the nodes has only a maximum of $4 \times 3/2 = 6$ failure modes. However, there are four of these nodes, so that the total number of failures that can take down a node in the network is $4 \times 6 = 24$. This has reduced the maximum number of system failure modes by a factor of five ($120/24=5$).

This effect is further demonstrated in Table 4 below. If the system is split into k nodes, the maximum number of failure modes is reduced by more than a factor k.

TABLE 4

Reducing Failure Modes via System Splitting

| System Size (processors) | No. of Nodes | Node Size (processors) | Max Failure Modes/Node | Max Sys Fail. Modes | Fail. Mode Reduction |
|---|---|---|---|---|---|
| 16 | 1 | 16 | 120 | 120 | 1 |
| 16 | 2 | 8 | 28 | 56 | 2.1 |
| 16 | 4 | 4 | 6 | 24 | 5 |
| 16 | 8 | 2 | 1 | 8 | 15 |

This relationship can be more formally expressed as follows. A system with n processors can have up to $$f_1 = \frac{n(n-1)}{2}$$

failure modes. If that system is split into k nodes, then each node has only n/k processors and can have up to $$\frac{\frac{n}{k}\left(\frac{n}{k}-1\right)}{2}$$

failure modes. However, there are k nodes that could fail. Thus the maximum number of system failure modes is $$f_k = k \frac{\frac{n}{k}\left(\frac{n}{k}-1\right)}{2} = \frac{n\left(\frac{n}{k}-1\right)}{2}$$

Define a reliability ratio R as $$R = \frac{f_1}{f_k}$$

Thus, R represents the decrease in the number of failure modes obtained by splitting a system into k nodes. From the expressions for $f_1$ and $f_k$, $$R = \frac{\frac{n(n-1)}{2}}{\frac{n\left(\frac{n}{k}-1\right)}{2}} \quad (7)$$

or $$R = k\frac{(n-1)}{(n-k)} > k$$

Thus, splitting a system into k nodes will reduce the maximum number of failure modes by more than k as shown in Table 4. As discussed earlier with regard to Equation (2) in section B of the Background of the Invention, this can increase system MTBF by more than k.

As an example, consider a 16-processor system that has an MTBF of five years, and in which processes are distributed randomly among the processors. Splitting this system into four nodes will reduce its number of failure modes by a factor of five (from 120 to 24), and increase its MTBF from five years to twenty five years. This shows the power of failure mode reduction.

A system of four nodes is now provided in which the mean time before one of the nodes fails is twenty five years. However, in this case, there are still three other nodes providing full processing capacity. In effect, the first node is backed up by three other nodes. (All nodes are active in this case, though some of the nodes could be passive nodes until another node fails. The following results would be the same.)

When a node does fail, the system loses only 25% of its capacity. It may be that the system is still considered to be operational in the presence of a single node failure. The probability that the system will lose more than 25% of its capacity due to a dual node failure can be estimated as follows. Assume that the mean time to repair for a node is four hours (this is a typical value for today's systems). Then the probability that the system will be down is 4 hours/25 years=0.000018. The probability that two specific nodes will fail simultaneously is $(0.000018)^2$. However, in a four node system, there are six ways in which two nodes can fail. Therefore, the probability that any two nodes will fail simultaneously is $6(0.000018)^2$. If the dual nodal failure lasts for four hours, then the mean time between a dual nodal failure is $4/[6(0.000018)^2]$' or 2,348 centuries. This shows the power of nodal sparing provided by splitting a system into smaller independent cooperating nodes.

Figure 5B:
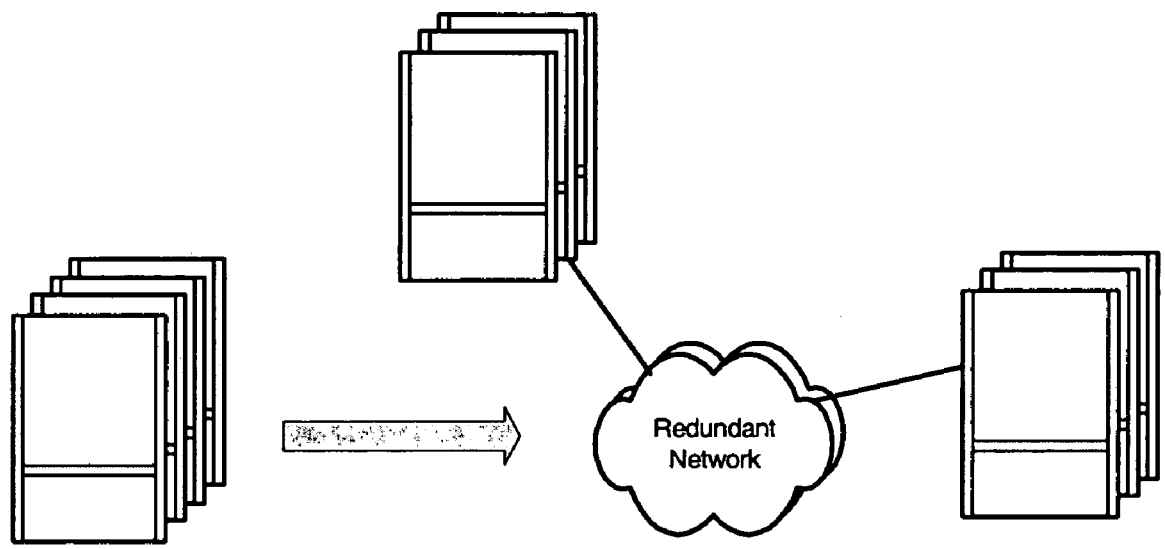
FIG. 5b shows a 4-processor system split into two 3-processor nodes and illustrates a system splitting approach in accordance with another preferred embodiment of the present invention.
Figure 5C:
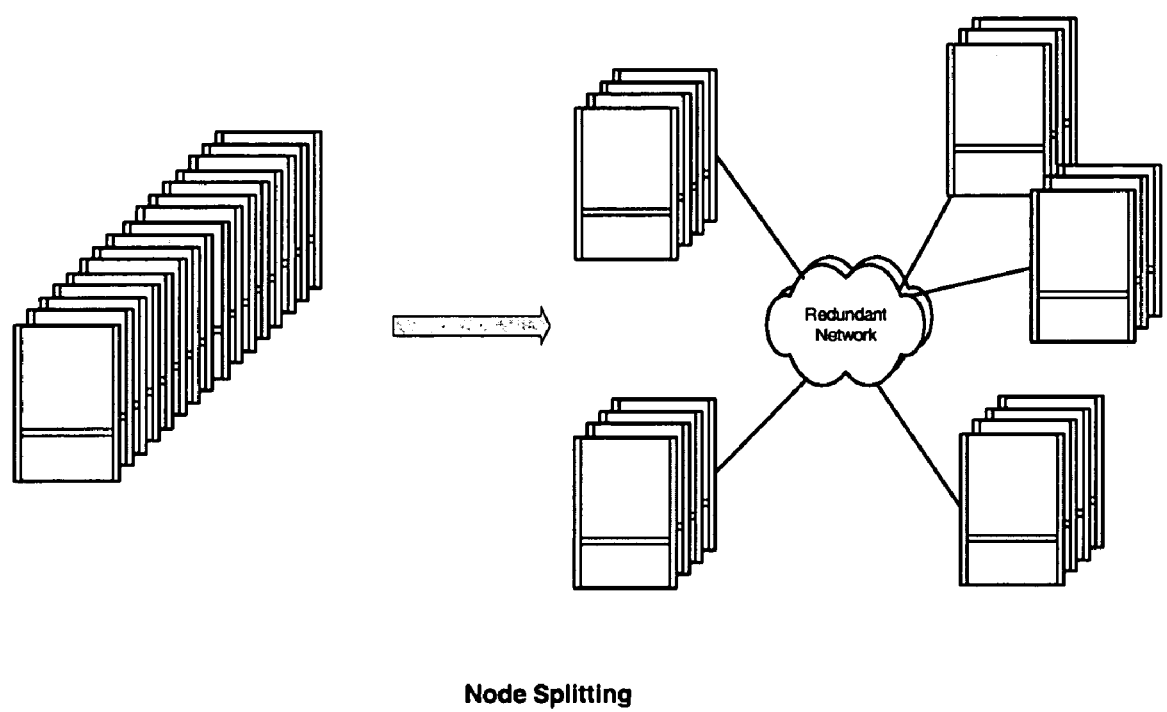
FIG. 5c shows a 16-processor system split twice and resulting in five nodes of different processor numbers in accordance with another preferred embodiment of the present invention.
Figure 5D:
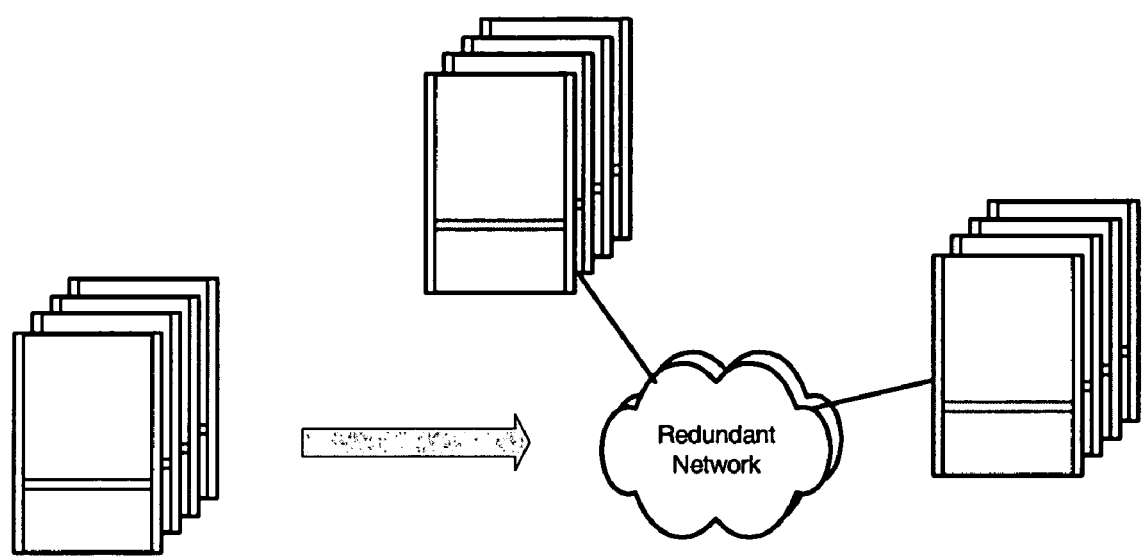
FIG. 5d shows a 4-processor system split into two 4-processor systems and illustrates a system splitting approach in accordance with another preferred embodiment of the present invention.
Figure 5E:
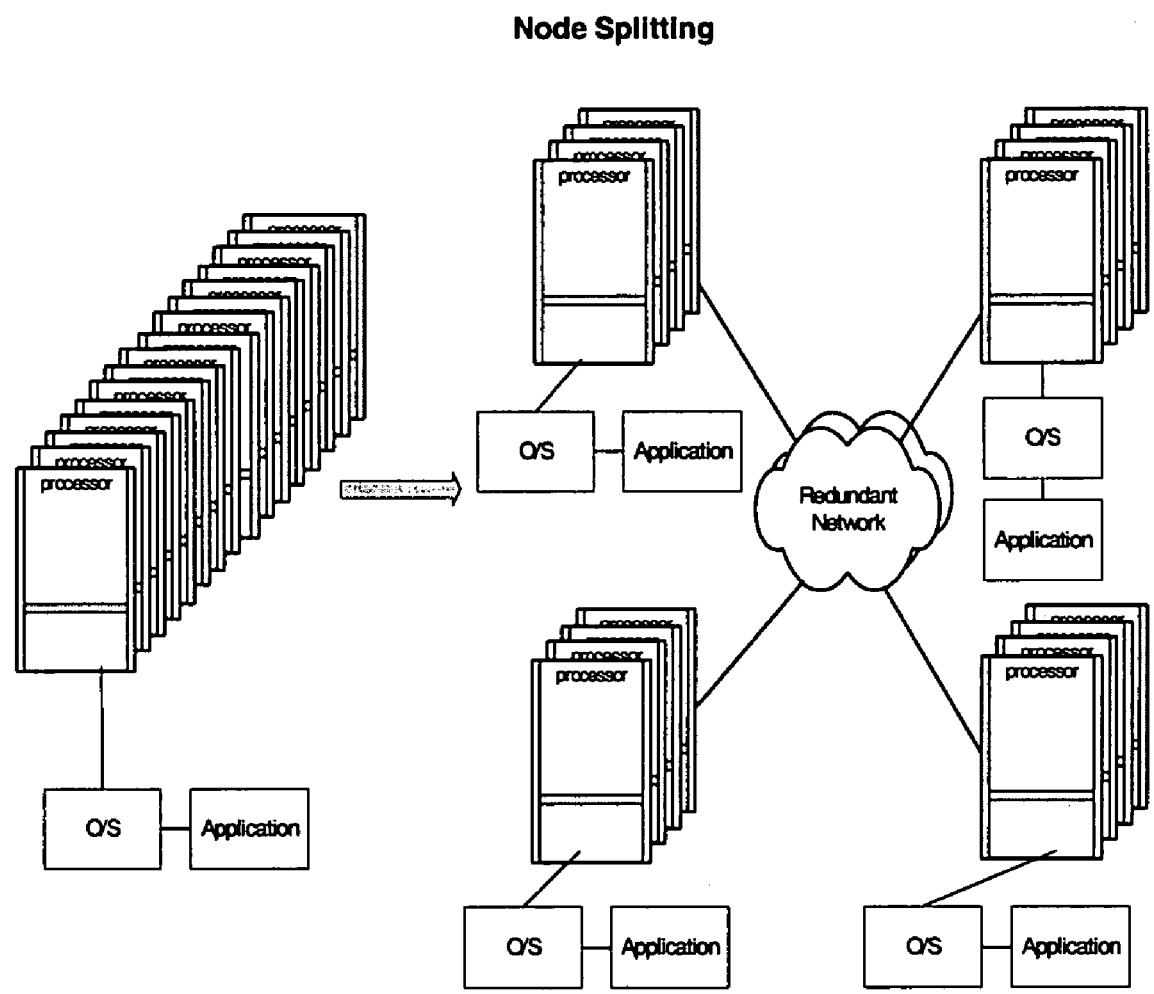
FIG. 5e shows a system having 16 processors, an operating system and a database split into four 4-processor nodes and illustrates a system splitting approach in accordance with another preferred embodiment of the present invention.

The above description assumes that the original system will be split into k nodes, each of equal size, with a total processor count equaling the original unsplit system. In fact, the advantages of system splitting can be achieved in much more general ways. For instance, FIG. 5b shows a 4-processor system that is split into two 2-processor nodes. However, it may be determined that a 2-processor node is incapable of handling all of the database updates, and so a third processor is added to each node to provide additional capacity. Similarly, FIG. 5c shows a 16-processor system which has been split into four 4-processor nodes, only to find out that one of the nodes is carrying a greater load. That node is expanded by adding two processors, and then is further split into two 3-processor nodes to achieve a greater availability. FIG. 5d shows splitting a system into two nodes, each equal to the original system, so that, in the event of a system failure, full capacity is still available to the users. FIG. 5e shows splitting a system that includes an operating system and an application. These and many other configurations that result from splitting a system achieve significant improvements in availability.

As seen in the following discussions, cost considerations often dictate that not all nodes be capable of independent functioning. However, in the implementations considered, it always takes the loss of at least two nodes to cause a system outage. Therefore, the loss of the entire system is still measured in hundreds of centuries. If the loss of one node is tolerable from a capacity and service viewpoint, then the system can be considered to have the commensurate availability. However, if the loss of one node creates a situation in which the required level of service cannot be maintained, then the increase in reliability is that afforded by failure mode reduction alone.

8.2 Replicating the Database

As opposed to replicating a full system for disaster recovery, in which the standby system is not participating in the processing, splitting a system for availability purposes requires that, in general, all nodes contribute their proportionate share to processing. (In some cases, certain nodes may be configured as spares and may not contribute to processing unless an active node fails. These nodes may be used for other functions during the time that they are acting as spares.) Since all nodes must potentially participate in the processing required of the system, this implies that each node must have access to the entire system database. Because each node is providing only a portion of the processing capacity, the processing load on the system as a whole is not inherently increased by system splitting. Consequently, the load imposed on the database is also not increased. It is just that, in the most general case, all nodes need access to all data.

8.2.1 Database Copy at Each Node

Figure 6:
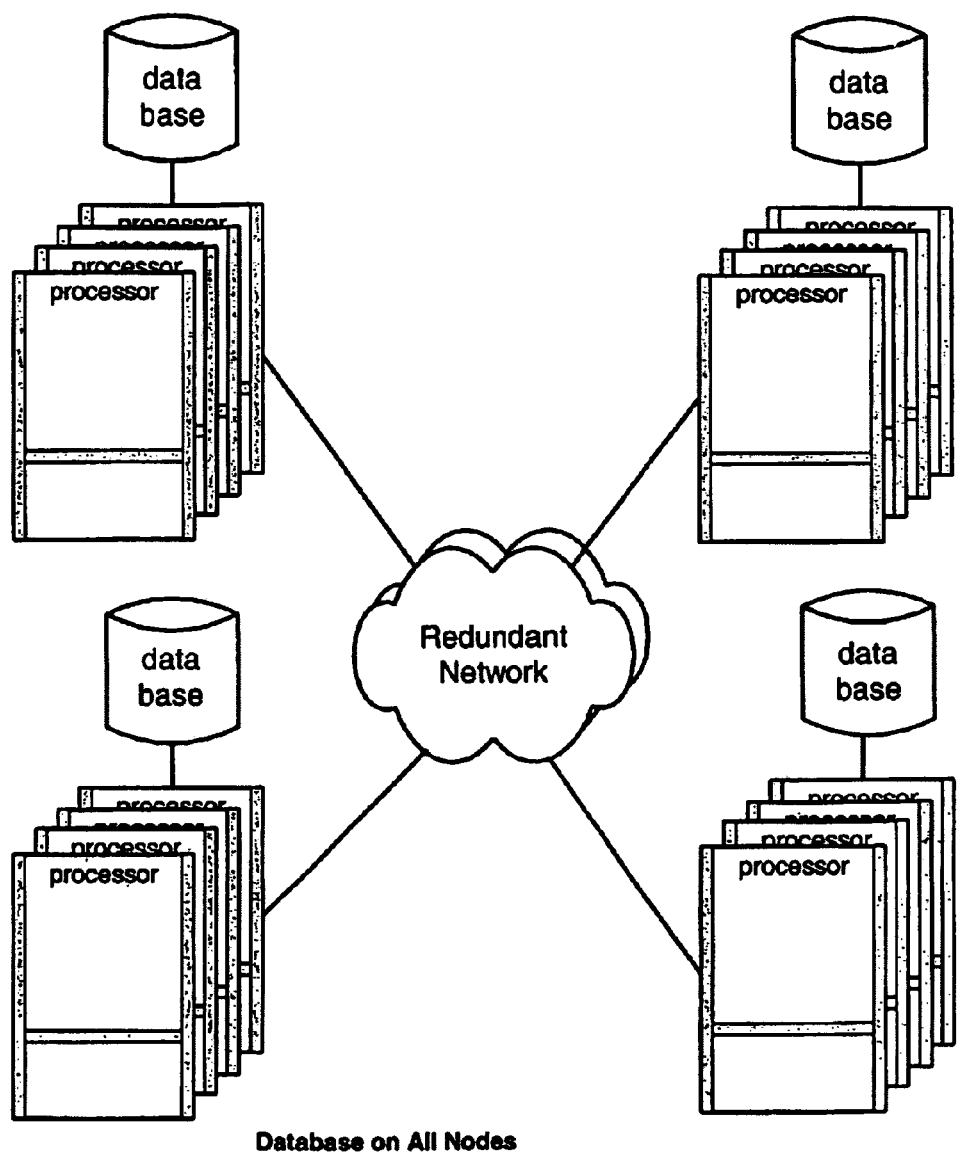
FIG. 6 shows a 16-processor system split into four 4-processor nodes wherein each node includes it own copy of the database in the system prior to splitting in accordance with one preferred embodiment of the present invention.

This can be accomplished in several ways. One method is for each node to have its own copy of the database as shown in FIG. 6. The databases are kept in synchronization as described later via data replication.

8.2.2 Database Replication Cost

This arrangement has a major problem, and that is the cost of the database. In many large systems, the database may represent the majority of the cost of the system. For reliability purposes, the database is often replicated in today's systems, a procedure called "mirroring;" that is, it is single-spared. However, in FIG. 6, the database is replicated k times, once for each node.

Prior art disk systems are inherently much more reliable than processing systems, primarily due to the effect of software faults and human interaction on processing systems. Replicated disk systems can have MTBFs measured in hundreds of centuries. Therefore, it is generally sufficient to have only two copies of the database in the network under the assumption that the network architecture is such that any node can access any operating database in the presence of node, database, or network failures.

8.2.3 Partitioned Database

Figure 7:
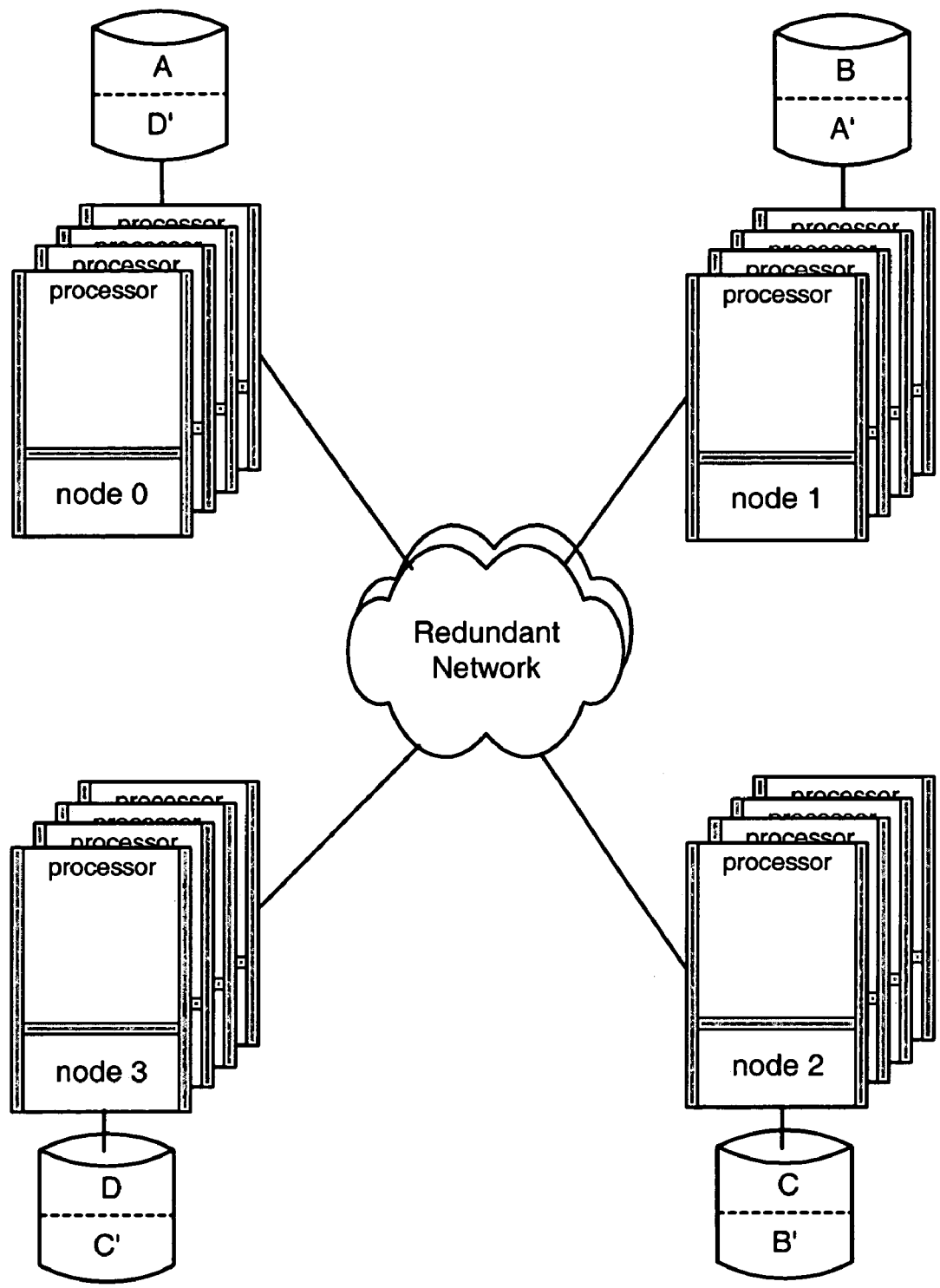
FIG. 7 shows system splitting using partitioned databases in accordance with one preferred embodiment of the present invention.

One way to achieve this is to partition the database across all nodes in such a way that there are only two copies of each data item in the network. For instance, FIG. 7 shows nodes 0, 1, 2, and 3, each with part of the data. The database is separated into four partitions, A, B, C and D with copies A', B', C', and D'. Partition A resides on node 0 and its copy A' resides on node 1. Partition B resides on node 1, and its copy B' resides on node 2, and so forth.

In this example scheme for a k-node system, the database is split into k partitions and each node contains 2/k of the database (½ of the database in the case of FIG. 7).

The scope of the present invention is meant to cover other data partitioning schemes, including those where the database is not evenly split, and those where the database may not even exist on one or more of the nodes.

As mentioned earlier, the simultaneous loss of two nodes is extremely unlikely (measured in centuries), so that access to at least one copy of the data is virtually guaranteed so long as the interconnecting network is redundant and reliable.

8.2.4 Split Mirrors

Figure 8A:
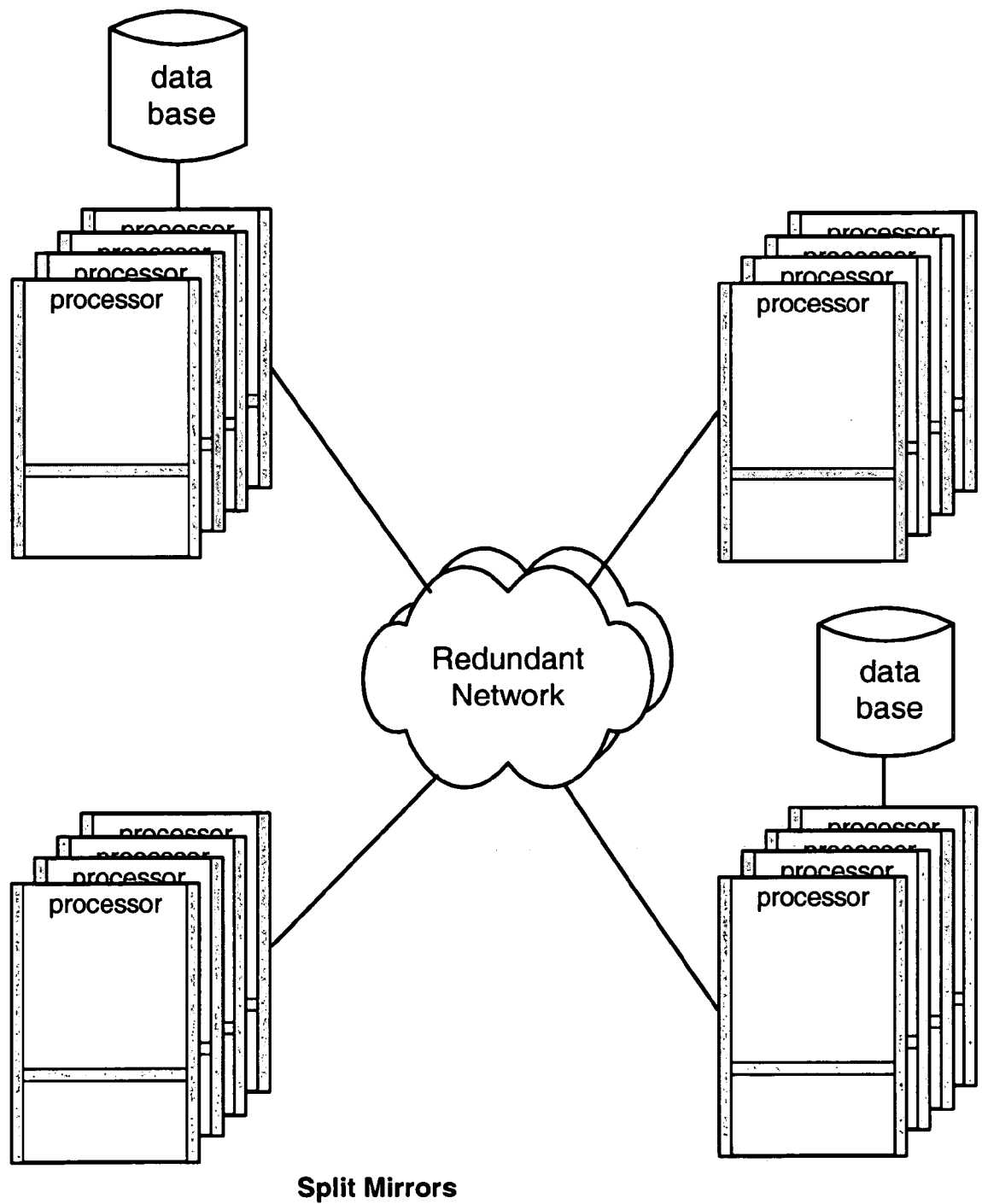
FIG. 8a shows system splitting using split mirrors in accordance with one preferred embodiment of the present invention.

Another way to achieve a single database sparing level across the network is to use split mirrors as shown in FIG. 8a. In this case, the entire database is contained on each of two nodes in the network. Even though some nodes have no resident data, all nodes have access to all data across the network.

Figure 8B:
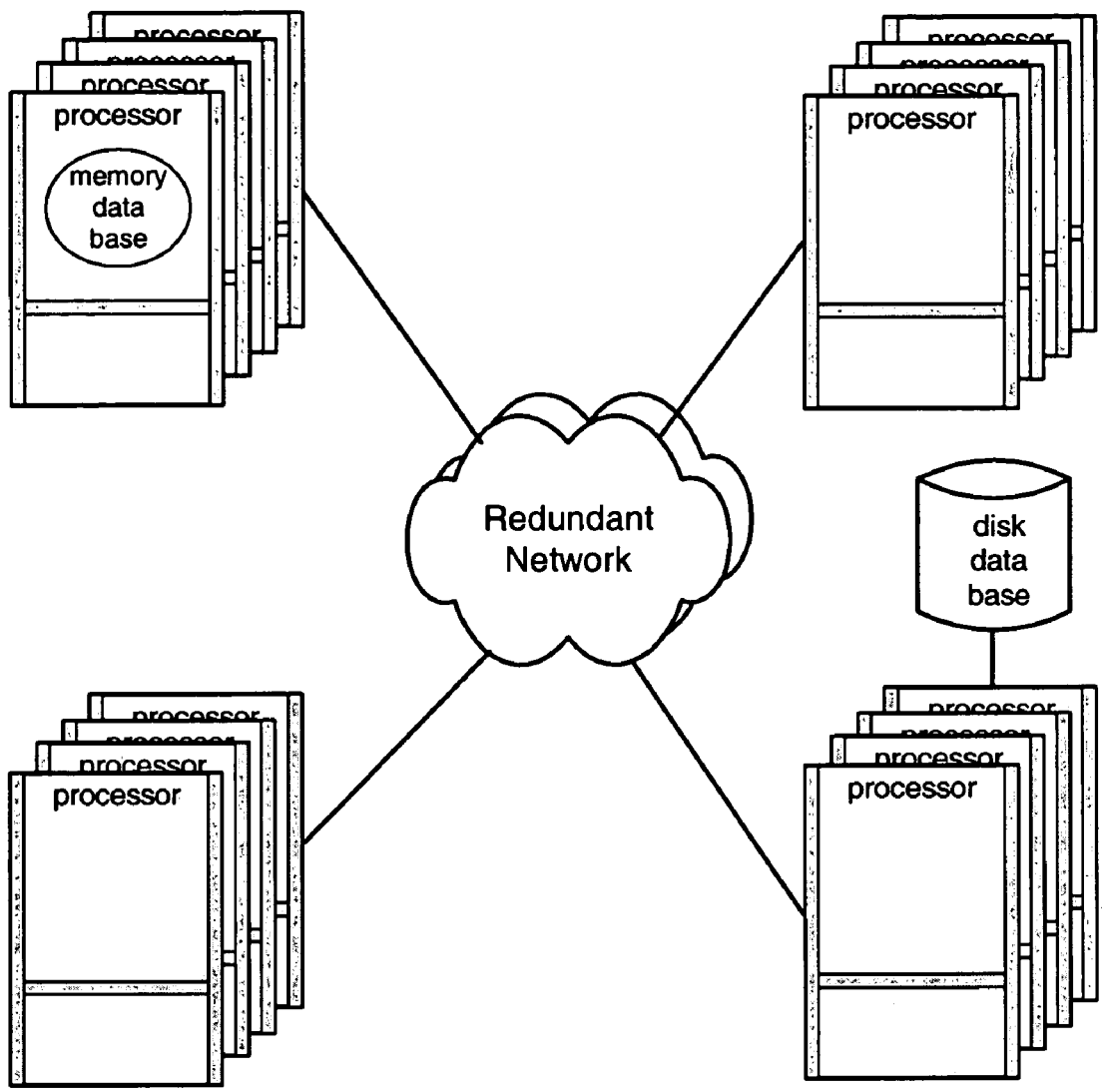
FIG. 8b shows system splitting using split mirrors in accordance with another preferred embodiment of the present invention.
Figure 8C:
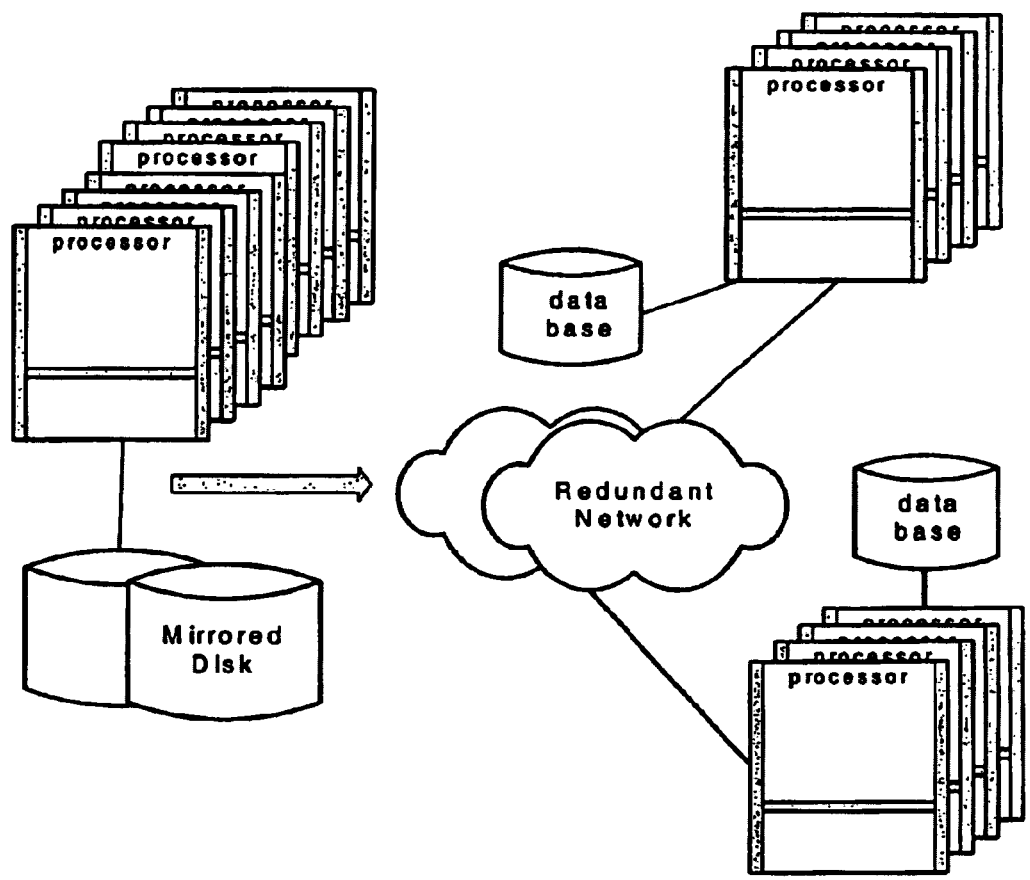
FIG. 8c shows an 8-processor original system with a mirrored database that has been split into two 4-processor nodes, each with a full copy of the database residing on one of the mirrors, and illustrates a system splitting approach in accordance with another preferred embodiment of the present invention.

FIG. 8a illustrates a database in which the data are stored on disk units. Of course, the data comprising the database may be stored in other media as well. In fact, different instances of the same database might be stored on different media, or the original database may be spread across different media. FIG. 8b shows a split mirror database in which one database of a mirrored pair uses a disk to store the data, and the other mirror stores the same data in the memory of another processor. For instance, the database might be stored on disk in the first processor to provide durability of data, and be stored in memory in the second processor to provide fast access to applications. FIG. 8c shows an eight-processor original system with a mirrored database, commercially available as an HP NSK (Non-Stop Kernel) system, that has been split into two four-processor nodes, each with a full copy of the database residing on one of the mirrors. These databases would be kept in synchronism by methods to be discussed later. The use of different storage media for storing a database, and in fact the use of different storage media for storing different instances of the same database, apply to all of the split system configurations described herein.

8.2.5 Network Storage

Figure 9:
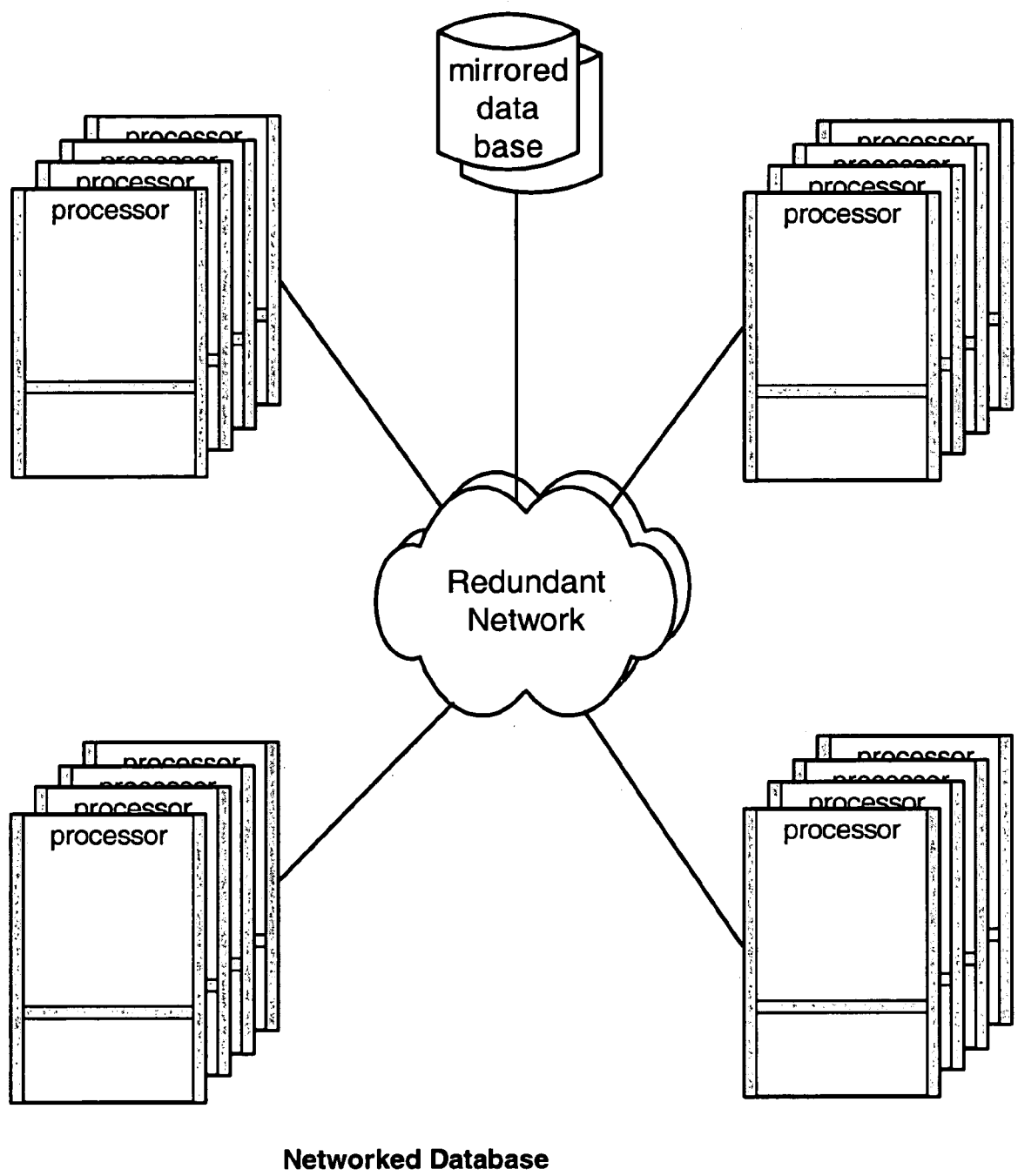
FIG. 9 shows system splitting with a networked database in accordance with one preferred embodiment of the present invention.

Yet another method for achieving dually replicated data in the network is to use network storage as shown in FIG. 9. Network storage is a storage device that is not associated with any particular node, but rather is attached to the network and is accessible by any node on the network. Network storage is also known as Network Attached Storage (NAS) or Storage Area Network (SAN) in today's commercial offerings.

Redundant network storage is available commercially today as mirrored disk storage or as RAID (Redundant Arrays of Inexpensive Disks).

8.2.6 Multiple Sparing

All of the architectures described above can be extended to provide more than one level of database sparing if the application so requires. For instance:

1. In FIG. 6, each of the k nodes contains a copy of the database. Therefore, there are k−1 spares in this configuration.
2. In FIG. 7, each partition could be hosted on d different nodes. This would give d copies of the database in the network, providing d−1 spares. For instance, if in FIG. 7 each of the four partitions were hosted on three nodes in the network (instead of two as shown), then there would be two spare copies of the database in the network.
3. In FIG. 8a, the database mirrors could be resident on more than two nodes. If there were a mirror on each of d nodes, then the system would have d−1 spares in the network.
4. In FIG. 9, the network-attached storage device could provide more than one spare. For instance, if it provided three copies of the database rather than two copies, there would be two spares in the network.

8.3 Replicating Data

The split architectures of FIGS. 6, 7 and 8 all require that independent databases across the network be kept in synchronization (for network storage shown in FIG. 9, the redundant database is kept in synchronization by the network storage controller). There are several methods for achieving this. Three such methods are discussed below.

8.3.1 Dual Writes

Figure 10:
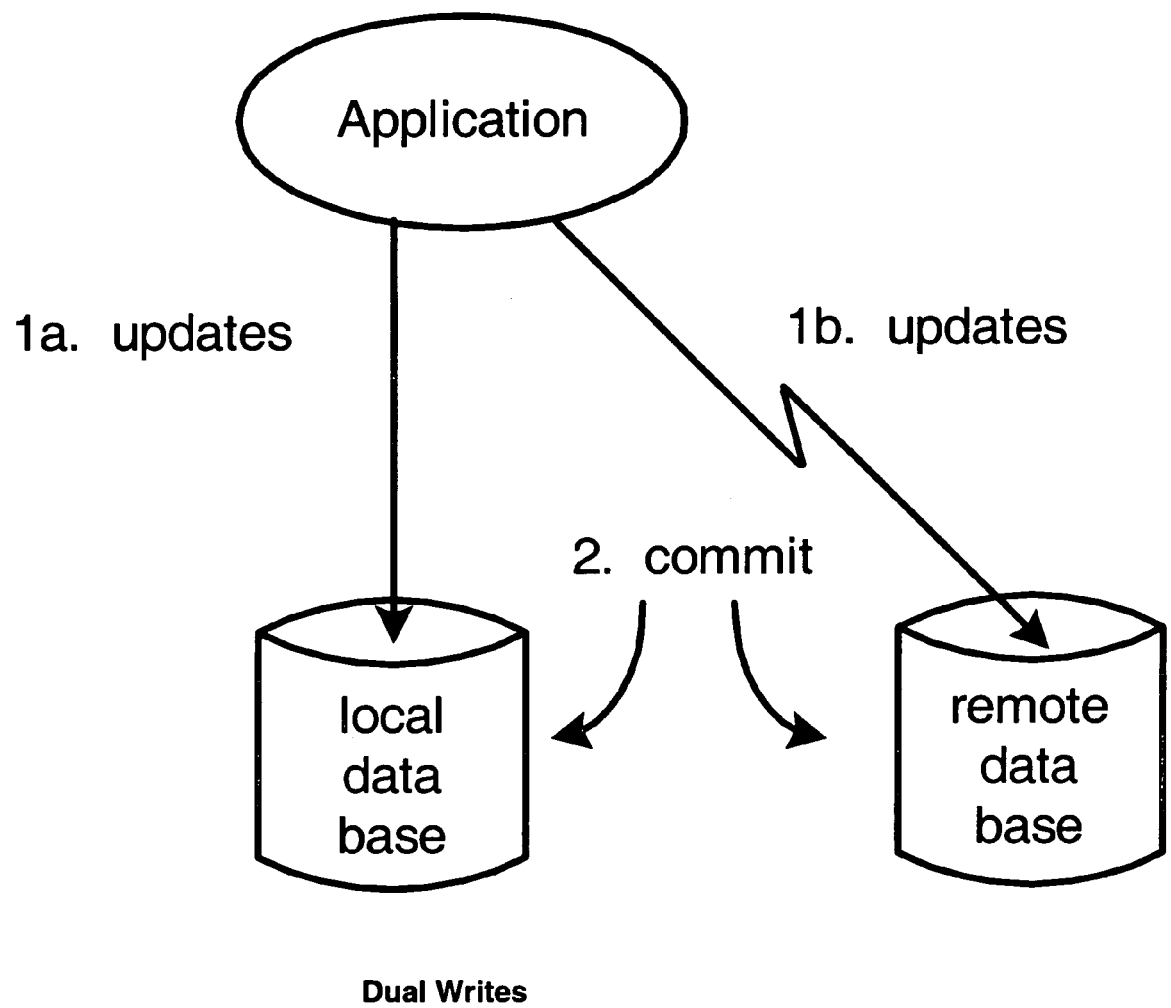
FIG. 10 shows a dual write process which can be used in the present invention for database synchronization.

One way to maintain database synchronization is for the application to specifically make its updates to all databases simultaneously (FIG. 10). In the prior art, a series of updates that are interrelated are grouped into a transaction, and a transaction manager assures that either all updates within a transaction are made (i.e., they are committed) or that, if there is a problem, no updates are made (i.e., they are all undone). Generally, though not always required, the updated data is locked against access by other processes until the transaction ends.

As the application updates data items as part of a transaction, it issues update commands to both databases (1a, 1b). When all updates have been made, the application completes the transaction by commanding both databases to commit these updates (2). If one of the databases is unable to apply these updates, then the transaction is aborted and all updates for that transaction that have been made to other databases are backed out. The result is as if the transaction had never happened.

If a node detects that it no longer has access to a remote node either due to the remote node's failure or to a network failure, then it will cease trying to update the database at the remote node so that it can continue with its transactions. Once the network is recovered, a synchronization facility is usually provided to re-synchronize the database copies.

There are several problems associated with dual writes:

1. Implementing dual writes is often intrusive in that current applications may have to be significantly modified in order to add the multiple update logic and to detect and handle inaccessible remote nodes.

2. If nodes are geographically disbursed, dual writes may significantly reduce performance since each update must travel over the communication network.

3. A database resynchronization capability may have to be implemented to resynchronize the databases in the event of a node or network failure. During such a failure, not all databases are getting all updates. Once the failure has been repaired, then all databases have to be brought into a common state.

8.3.2 Asynchronous Data Replication

Figure 11:
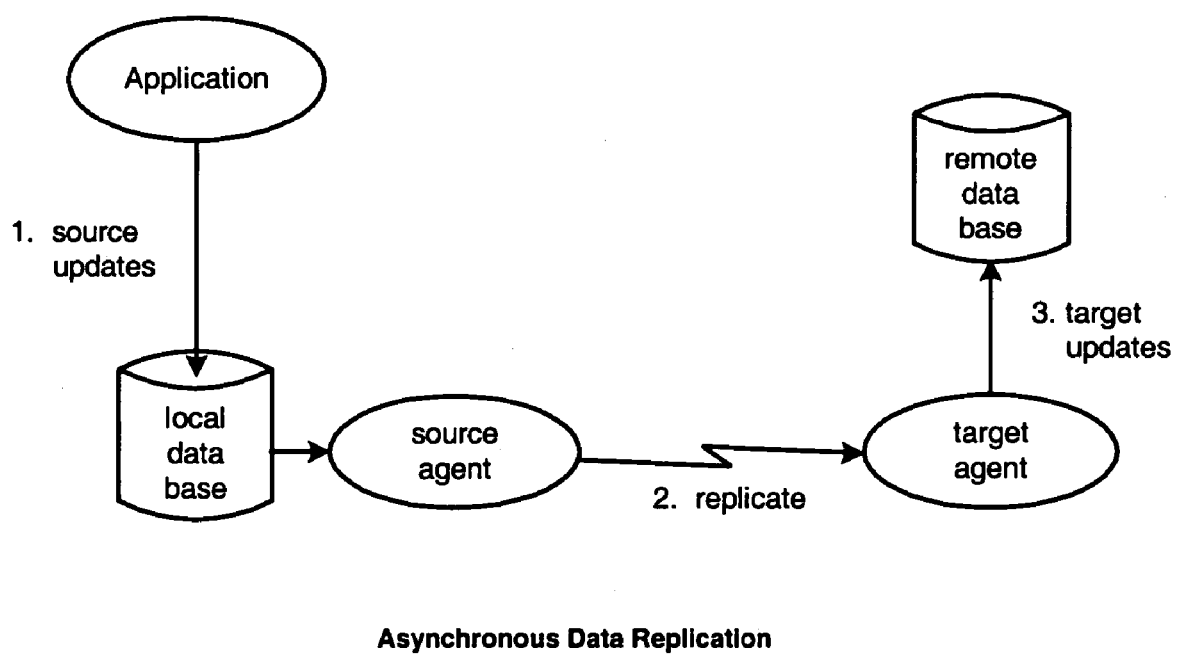
FIG. 11 shows an asynchronous replication process which can be used in the present invention for database synchronization.

Another method for data replication is to use one of the commercially available data replication products, such as Shadowbase®, commercially available from ITI, Inc., Paoli, Pa. One example implementation of a data replication facility has a source agent and a target agent that runs on each node of the network (FIG. 11). Each source agent monitors the state of its local database looking for updates that have been made to it. It may do this by monitoring a separate update log or by trapping update commands issued by the application.

When a source agent detects an update (1), it sends the update to the target agent(s) at the remote node(s) that also need to make this update (2). It may do so immediately, or it may wait and do it later. For example, it may wait until it has a block of updates to send in order to improve communication channel efficiency.

When a target agent at a node receives an update or a block of updates, it will apply these updates to its database (3). Because the updates to the remote system are made independently of the originating system, this method of data replication is called "asynchronous data replication." It has the advantage that it is transparent to the source system and does not slow it down. However, there is a time lag known as "replication latency" from the time that the source system makes its update to the time that that update is made at the target system.

When a system is split, all nodes may be active and may be updating the system's database. These updates often must be replicated across the network to the database copies to keep them in synchronism. Thus, in such an "active/active" application, all nodes are configured with their own source and target agents and all are active in simultaneously replicating different updates across the network.

Thus, relative to dual writes, asynchronous data replication has the following advantages:

1. It is usually non-intrusive in which case no changes to the application programming code are required.

2. It does not slow down the application, as data replication proceeds independently of the application.

3. Data replication products generally provide database resynchronization facilities to bring the databases into a common and consistent state following recovery from a node or network failure.

However, asynchronous replication has the following characteristics which may be a problem in certain applications:

1. Provision must be made in the data replication facility to avoid "ping-ponging," or the return of an update back to the source system. This could cause the endless circulation of an update around the network. There are methods that a data replication facility can use to avoid ping-ponging. U.S. Pat. No. 6,122,630 (Strickler et al.), which is incorporated by reference herein, discloses a bidirectional database replication scheme for controlling transaction ping-ponging.

2. If a node fails, one or more transactions might be lost in the replication pipeline due to replication latency. However, these will generally be recovered when the databases are resynchronized following recovery.

3. The fact that a remote node is updated some time after the source node is updated means that a particular data item might be updated independently at two or more nodes at nearly the same time. In some applications, this is not a problem. For instance, if the data is partitioned across the nodes in such a way that only one node can update any given partition, then there will not be simultaneous updating of the same data item. Another example is the logging of events, which is simply an insert of a new record or row into the database. The insertion of event data into the database can be simultaneously done by multiple nodes without concern for conflict. However, if the same data item can be updated (that is, changed) by more than one node, then it is possible for the same data item to be changed to different values by two or more different nodes at the same time. The resulting "new" values for that data item are then inconsistent, and when they are sent across the network for replication they create a data collision. The result is that the databases are now in an inconsistent state, and the value for this data item must be resolved. This process can be automated in some cases, but is often a manual process.

8.3.3 Synchronous Data Replication

If data collisions can occur and cannot be easily resolved, they must be avoided. This can be done by updating all copies of the data item simultaneously across the network. No other change is allowed to a data item until all copies have been successfully modified by the current update.

Dual writes described above manage this by acquiring locks on all copies of the data item across the network before changing any of them. However, dual writes have several problems as described previously.

Figure 12:
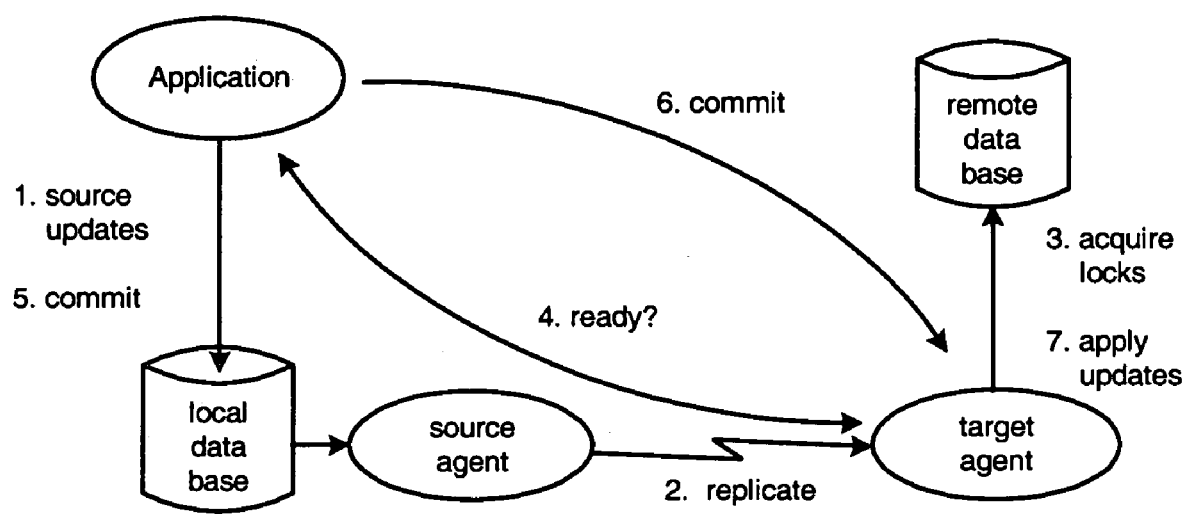
FIG. 12 shows a synchronous replication process which can be used in the present invention for database synchronization.

Another method for accomplishing this is through synchronous data replication as shown in FIG. 12. Synchronous replication proceeds much like asynchronous replication. As updates are made to the source database (1), they are sent by the source agent to the applicable target agent(s) (2). However, in this case, the target agent begins a transaction and acquires locks on the data items to be modified (3), but does not yet make permanent updates to those data items. Synchronous data replication is described in U.S. patent application Ser. No. 10/112,129 filed Mar. 29, 2002 entitled "Collision Avoidance in Database Replication Systems," also, U.S. Patent Application Publication No. 2002/0133507 dated Sep. 19, 2002, which are incorporated by reference herein.

When the source system is ready to commit the transaction, the source agent asks the target agent if it is ready to commit (4). If the target agent is successfully holding locks on all of the data items to be updated, it responds positively. The source agent then allows the transaction updates to be committed to the source database (5). If this is successful, it then instructs the target agent to commit its updates (6), (7). The source system does not have to wait for the target system to commit its updates. It is free to proceed with other processing as soon as it instructs the target system to commit its updates.

If the target agent is unable to obtain the locks it needs, it will so inform the source agent and the source agent will cause the transaction to be aborted. Likewise, if the target agent has acquired its locks but the transaction commit fails at the source system, then the source agent will instruct the target agent to abort the transaction.

Synchronous data replication has the following advantages:

1. Like asynchronous data replication, it is often non-intrusive, in which case no changes need be made to the application program.

2. Synchronous data replication products generally provide a database resynchronization facility.

3. Like dual writes, synchronous data replication eliminates data collisions.

4. Relative to dual writes, synchronous replication is more efficient for geographically dispersed nodes because the application must wait only for the ready-to-commit message from the target system rather than for each update to be completed at the target system.

However, unlike asynchronous replication, synchronous replication does impact the performance of the application because of the requirement to wait for the ready-to-commit message. Asynchronous replication imposes no performance penalty on the application.

8.4 Disaster Recovery

Splitting a system brings an additional benefit. If the nodes are geographically disbursed, then the system will survive a natural or man-made disaster such as a fire, flood, earthquake or terrorist act, albeit with reduced capacity (by a factor of $(k-1)/k$). Most of the split system architectures described above are candidates for geographic dispersal. For disaster recovery, network storage as shown in FIG. 9 is not appropriate unless the database copies can be geographically distributed. The data must be geographically dispersed along with the processing capabilities.

As noted above, synchronous data replication is appropriate for geographically distributed split systems to maximize performance if data collisions must be avoided. Dual writes are more appropriate for campus-type environments if application modification is acceptable and if a database resynchronization facility is available or can be developed.

8.5 The Communication Network

A split system requires a redundant, reliable communication network to interconnect the nodes. If the systems are closely located, this could be provided by a dual LAN or by a redundant communication fabric such as HP's ServerNet or Infiniband®.

If the systems are geographically dispersed, then two completely independent communication networks, perhaps provided by different carriers, should be provided. Care must be taken to ensure that the networks do not share a common geographical point that could be affected by a disaster.

The anticipated reliability of the communication network should be commensurate with the system reliability. If the split system is designed to have an expected MTBF of 100 years and the communication network has an MTBF of 100 years, then the composite system will have an MTBF of 50 years.

8.6 Performance

Splitting a system can significantly increase the availability of a system, but may entail tradeoffs relative to the performance and cost of that system. Performance considerations include the following:

1. If nodes are configured to be too small, then a node with a failed processor may not be able to provide sufficient processing capability to be useful. For instance, if a 16-processor system is split into eight 2-processor nodes, a node will be reduced to one processor if one of its processors fail. This may not provide enough capacity to allow the node to function. In this case, a single-processor fault will cause a node failure, and the benefit of sparing is lost, as is the availability advantage of splitting the system.

2. If cost is to be contained by providing only two copies (or more correctly less than k copies if there are k nodes) of the database on the network, then any particular data item is locally available to only some nodes. All other nodes must access that data item over the network. Network access of data items will slow down a transaction.

3. If the database copies must be kept in exact synchronism, then transactions will be slowed down due to the coordination of updates required over the network. If dual (or multiple) writes are used, then a transaction is delayed by the time that it takes for each update to access the data to be changed over the network, and then for the data changes to be propagated over the network and their completion status returned. If synchronous data replication is used, then the transaction must wait for a confirmation from each remote node that it is prepared to commit. These delays are not encountered if asynchronous replication is used to synchronize the databases.

4. Synchronous replication, whether done by dual writes or synchronous data replication, requires that locks be held on data items that are to be updated until the transaction is completed. Because transactions will take longer due to network delays, these locks will be held longer which may delay other transactions that need access to these data items. This is not an issue with asynchronous data replication.

5. When replicating the database (such that there are two or more copies of it available in the system), the replicating facilities may add some level of overhead to the nodes containing additional spares. For example, each additional spare of the database means that the database update operations must be performed on that additional spare. Hence, single systems that are running at or near full capacity may need additional capacity added to one or more of the nodes when they are split. Similarly, the split may add additional communication load to each of the nodes, and hence additional capacity may need to be added to one or more of the nodes to handle that additional load.

8.7 Implementations

FIGS. 6, 7, 8 and 9 have illustrated various ways in which a system may be split to improve its availability. Each method has in common the splitting of a single system into a number of smaller nodes interconnected by a reliable network. What distinguishes them is the way in which the common database is distributed.

These architectures are summarized below along with their pertinent availability, performance, and cost characteristics. In the following descriptions, "k" refers to the number of nodes.

8.7.1 Full Database on Each Node

FIG. 6 shows a split system with a full database resident at each node.

1. This is the highest cost system since k full databases must be provided, one for each node.
2. The nodes can be geographically distributed to provide full disaster tolerance.
3. When an update is made, it must be made to k nodes, k−1 of which are remotely located. When data is to be accessed, it can be accessed locally. Therefore, this configuration will be most appropriate for applications with small databases (to contain cost) that are heavily read-oriented with little update activity (to minimize the impact on performance).
4. The databases must be kept synchronized. If data collisions are not deemed to be a problem, then asynchronous data replication may be used. If data collisions must be avoided, then dual writes (actually multiple writes in this case) may be used if the systems are closely located and transactions are small. Otherwise, synchronous data replication should be used.

8.7.2 Partitioned Database

FIG. 7 shows data partitioned across the nodes such that there are two copies of the database in the network.

1. This configuration adds little if any hardware cost to the original single system. It requires the same number of processors and the same disk capacity.
2. The nodes can be geographically distributed to provide full disaster tolerance.
3. When an update is made, it must be made to at most two remote nodes.
4. If the application is logically partitioned geographically, then this architecture can be very efficient. For instance, if the application supports several sales offices, it may be that a sales office "owns" its data and is the only entity that can update that data. That sales office may also be the primary consumer of its data. In this case, if each sales office had its own node that contained a copy of the data which it owned, then each update must be made to only one remote node and most read activity is local.
5. The databases must be kept synchronized. If data collisions are not deemed to be a problem, then asynchronous data replication may be used. If data collisions must be avoided, then dual writes may be used if the nodes are closely located and transactions are small. Otherwise, synchronous data replication should be used.
6. If the application data can be geographically partitioned as described above, then there is no possibility of data collisions and asynchronous data replication may be used.

8.7.3 Split Mirrors

FIG. 8a shows data distributed over the network as two split mirrors. Two nodes each contain a complete copy of the database, and the remaining nodes contain no database.

1. This configuration adds little if any hardware cost to the original single system. It requires the same number of processors and the same disk capacity.
2. The nodes may be geographically distributed to provide full disaster tolerance.
3. When an update is made, it must be made to at most two remote nodes.
4. Two of the nodes have local access to all data. The rest of the nodes must access data across the network.
5. This architecture is particularly suited to headquarters applications in which most database activity is centered at one or two sites. Nodes at the other sites accommodate casual users who are primarily accessing data.
6. This architecture has higher availability than that using partitioned databases. This is due to reduced nodal failure modes. For the split mirror configuration, there is only one nodal failure mode—both nodes holding a database copy must fail. If the database is partitioned over k nodes as shown in FIG. 7, then the failure of any two nodes will cause a system failure since now a portion of the database is unavailable. Therefore, the number of nodal failure modes in a partitioned system is k(k−1)/2 rather than just one.
7. The databases must be kept synchronized. If data collisions are not deemed to be a problem, then asynchronous data replication may be used. If data collisions must be avoided, then dual writes may be used if the nodes are closely located and transactions are small. Otherwise, synchronous data replication may be used.

8.7.4 Network Storage

FIG. 9 shows a split system in which each node can access a single independent redundant database over the network.

1. This configuration adds little if any hardware cost to the original single system. It requires the same number of processors and the same disk capacity.
2. This configuration is not suitable for disaster tolerance since the entire database is located at one site. If that site is destroyed, the system is down.
3. All updates and all read activity must be made over the network.
4. There is no need for data replication in this configuration.

8.7.5 Distributed Network Storage

Figure 13:
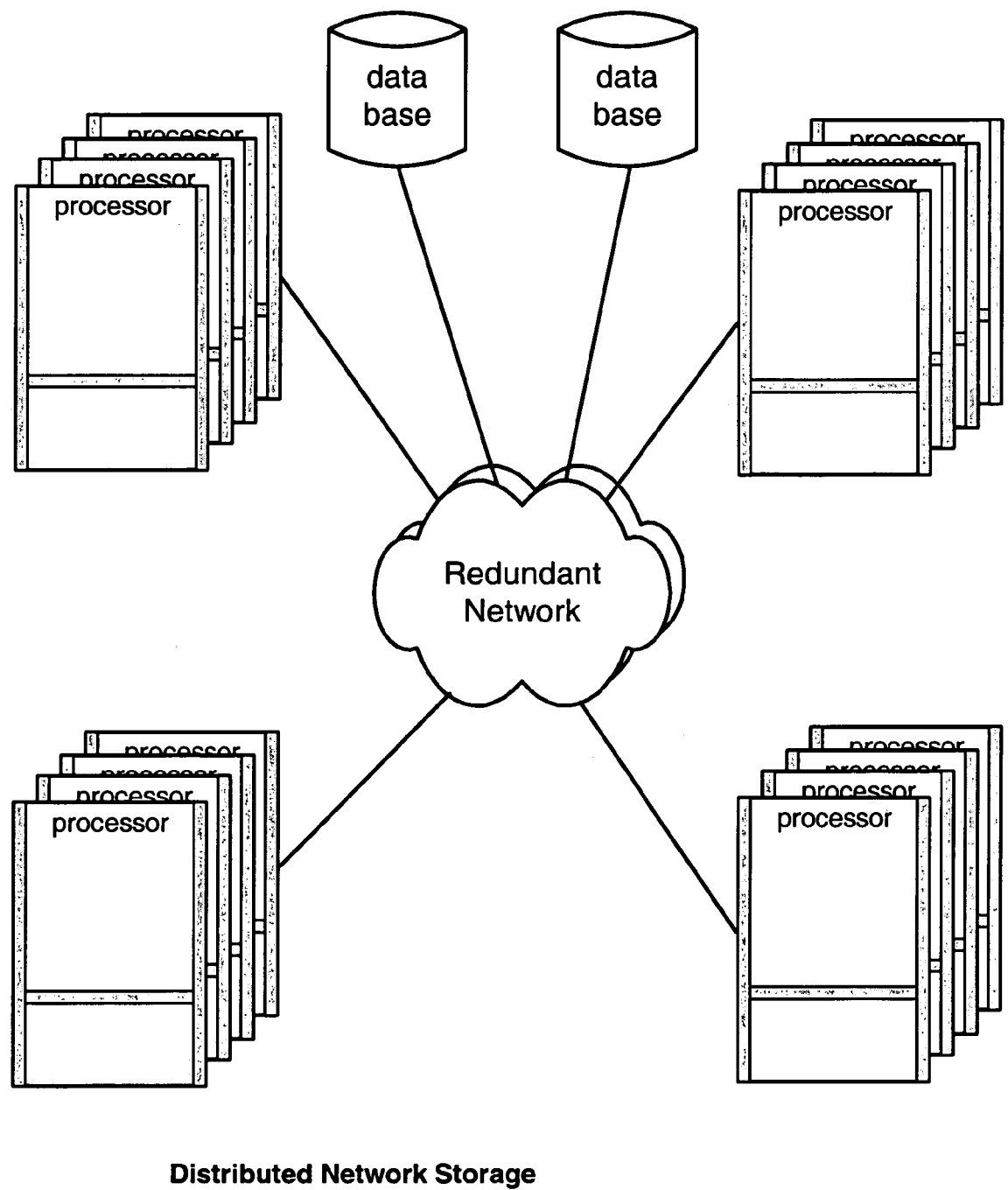
FIG. 13 shows a split system with distributed network storage in accordance with one preferred embodiment of the present invention.

It is also possible to provide redundant network storage that is distributed across the network as shown in FIG. 13. In this case, the redundant halves of the database are connected independently to the network, and may be geographically distributed to provide full disaster tolerance.

In this configuration, one database is designated the master and controls all data item locks. The other database is the backup copy. Updates that the master database makes are sent over the network to the backup database. If the master database goes down, the backup database becomes the master.

8.7.6 Other Configurations

Figure 14:
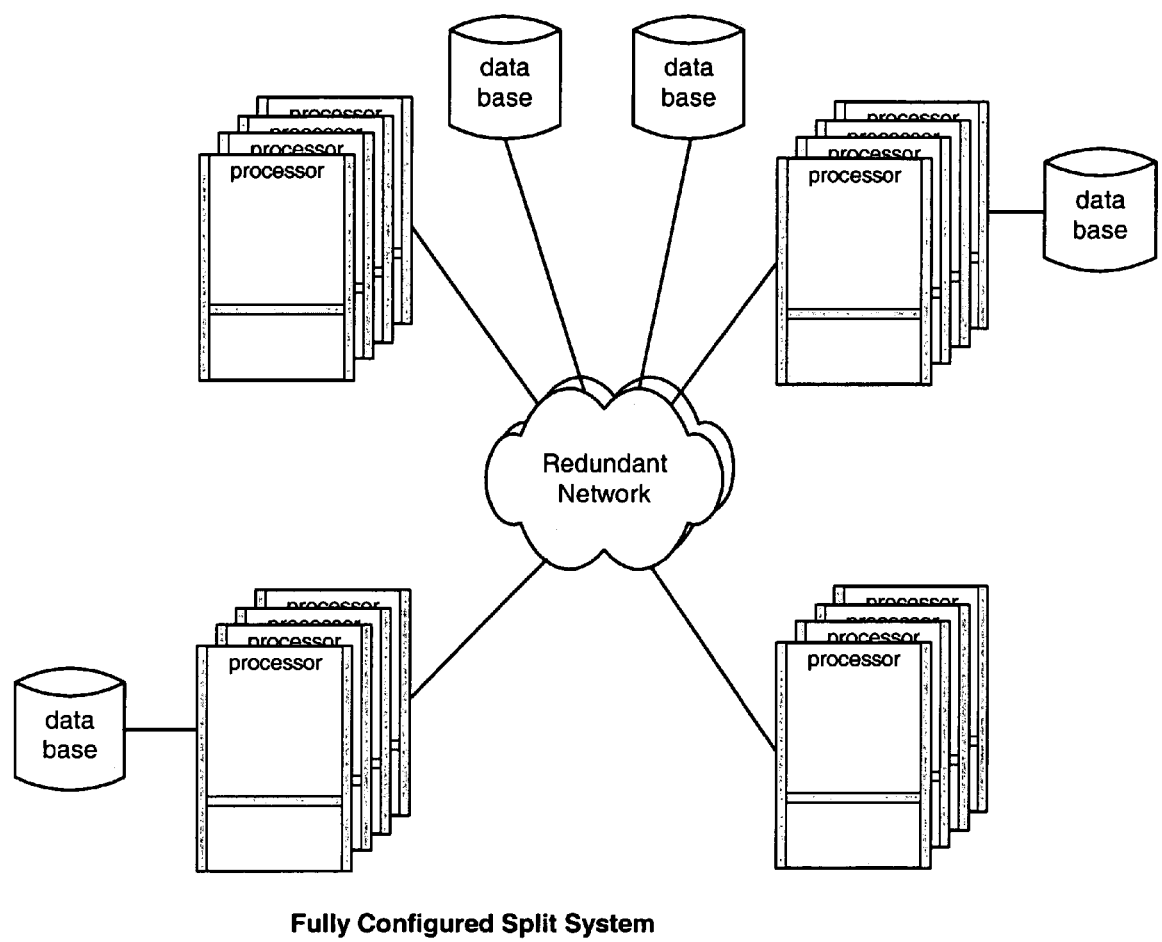
FIG. 14 shows a fully configured split system in accordance with one preferred embodiment of the present invention.

In addition to those configurations described above, there are many other configurations for split systems. For instance, FIG. 14 shows a split system comprising processing nodes, database nodes, and database processing nodes.

Figure 15:
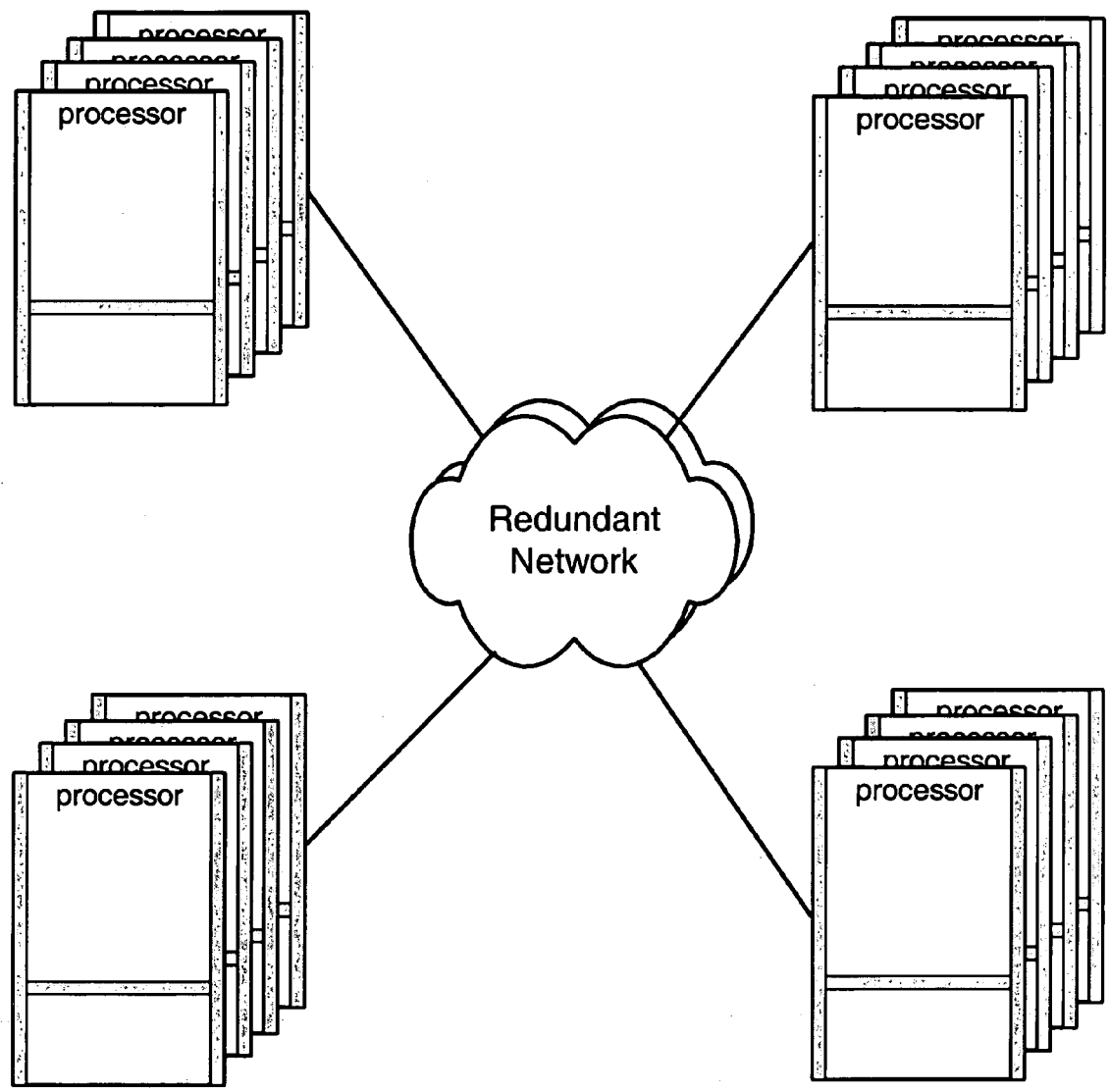
FIG. 15 shows a split system having only processing nodes in accordance with one preferred embodiment of the present invention.

In some systems (such as monitoring systems), there may not be a system database. Rather, events are monitored and compared to other events detected by the system. Based on the occurrence of certain events or combinations of events, some action is taken such as issuing a control to some external device, generating an alarm, and/or logging the event. The event logs may not be considered a system database. In this case, the system can be split into processing nodes alone, with no need for database nodes, as shown in FIG. 15.

APPENDIX

Availability Approximations

The availability relationships described herein are noted to be approximations. But how good are these approximations?

Consider a system of n identical elements arranged such that s of these elements are spares. That is, (n−s) elements must be operational in order for the system to be operational. The probability that an element will be operational is denoted by a:

a=probability that a system element is operational.

At any point in time, the system may be in one of many states. All n elements could be operational; n−1 elements could be operational with one failed element; and so on to the state where all elements have failed.

Assuming that element failures are independent of each other, then the probability that n elements will be operational is $a^n$; the probability that a specific set of n−1 elements will be operational is $a^{n-1}(1-a)$ (that is, n−1 elements are operational, and one has failed); and so on. Let $f_i$ be the number of ways in which i different elements can fail (that is, the number of different system states leading to n−i operational elements and i failed elements):

i number of failed elements $f_i$ number of ways in which exactly i elements can fail.

Then the probability that the system state will be that of i failed elements is:

$$f_i a^{n-i}(1-a)^i$$

$f_i$ is the number of ways that i elements can be chosen from n elements:

$$f_i = \binom{n}{i} = \frac{n!}{i!(n-i)!}$$

Since the range of i from 0 to n represents the universe of system states, then it follows that $$\sum_{i=0}^{n} \binom{n}{i} a^{n-i}(1-a)^i = 1$$

Since there are s spares in the system, only those states for which i>s can represent system failures. Furthermore, for any given number i of element failures, not all $f_i$ combinations may result in a system failure. Perhaps the system may survive some combinations of i failures even though this exceeds the number of spares. Let $f'_i$ be the actual number of combinations of i failures that will lead to a system failure:

$f'_i$=number of combinations of i failures that will cause a system failure.

Then the probability of system failure, F, is $$F = \sum_{i=s+1}^{n} f'_i a^{n-i}(1-a)^i \quad (A-1)$$

If a is very close to 1 so that (1−a) is very small, then only the first term of Equation (A-1) is significant (this depends on $f_i$ not being a strong function of i, which is usually the case). Equation (A-1) can then be approximated by $$f'_{s+1} a^{n-s-1}(1-a)^{s+1} \quad (A-2)$$

Furthermore, since a is very close to 1 (and if n−s−1 is not terribly large), then $$a^{n-s-1} \approx 1$$

Defining $f$ to be $f'_{s+1}$, then Equation (A-2) can be further approximated by $$F \approx f(1-a)^{s+1} \quad (A-3)$$

and system availability A is approximately $$A \approx 1 - f(1-a)^{s+1} \quad (A-4)$$

where
  a is the availability of a system element
  s is the number of spare elements
  $f$ is the number of ways in which s+1 elements can fail in such a way as to cause a system failure
  F is the approximate probability of failure of the system
  A is the approximate availability of the system
Equation (A-4) is the same as Equation (5) derived heuristically earlier.

A feel for the degree of approximation afforded by Equation (A-4) is shown in Table A-1 (FIG. 16) for a=0.995, n ranging from 2 through 16, and s ranging from 0 through n−1. This table shows that the maximum approximation error does not exceed 5% over this range of parameters. The value of this approximation lies not so much in its calculation ease (especially in today's world of spreadsheets) as it does in the insight it provides about the roles that failure modes, sparing, and element reliability play in system availability.

The present invention may be implemented with any combination of hardware and software. If implemented as a computer-implemented apparatus, the present invention is implemented using means for performing all of the steps and functions described above.

Changes can be made to the embodiments described above without departing from the broad inventive concept thereof. The present invention is thus not limited to the particular embodiments disclosed, but is intended to cover modifications within the spirit and scope of the present invention.

What is claimed is:

1. A split processing system comprising:
  (a) a plurality of nodes, each node including one or more processors;
  (b) a communication network that allows the one or more processors at each of the nodes to cooperate with each other; and
  (c) means to allow one or more of the nodes to take over processing capacity of a node that becomes lost, the availability of the split processing system being greater than the availability of an unsplit system wherein all of the processors are located at a single node, wherein at least some of the nodes are database processing nodes which include an instance of a portion of a database or an instance of all of a database.

2. The system of claim 1 wherein at least some of the nodes are processing nodes which do not contain a database.

3. The system of claim 2 wherein at least some of the nodes that do not contain a database are provided access to contents of databases in other nodes via the communication network.

4. The system of claim 1 wherein each of the database processing nodes further comprise an operating system and one or more applications.

5. The system of claim 1 wherein at least some of the database processing nodes include disk systems having one or more disk drives for accessing the respective databases.

6. The system of claim 1 wherein at least some of the database processing nodes include memory-resident systems having one or more memory-resident storage devices.

7. A split processing system comprising:
(a) a plurality of nodes, each node including one or more processors;
(b) a communication network that allows the one or more processors at each of the nodes to cooperate with each other; and
(c) means to allow one or more of the nodes to take over processing capacity of a node that becomes lost,
the availability of the split processing system being greater than the availability of an unsplit system wherein all of the processors are located at a single node,
wherein at least some of the nodes include an instance of a portion of a database or an instance of all of a database.

8. The system of claim 7 wherein at least some of the nodes have the same portion of the database as each other, the nodes that have the same portion of the database as each other further comprise database replication software which allows the same portions of the database to remain synchronized whenever the contents of the database at one of the nodes is changed.

9. The system of claim 8 wherein database replication software performs the synchronization using synchronous replication.

10. The system of claim 8 wherein database replication software performs the synchronization using asynchronous replication.

11. The system of claim 8 wherein database replication software performs the synchronization using dual write synchronization.

12. A split processing system comprising:
(a) a plurality of nodes, each node including:
(i) a processor subsystem including at least one processor, and
(ii) an operating system;
(b) a communication network that allows the one or more processors at each of the nodes to cooperate with each other; and
(c) means to allow one or more of the nodes to take over processing capacity of a node that becomes lost,
the availability of the split processing system being greater than the availability of an unsplit system wherein all of the processors are located at a single node,
wherein at least some of the nodes include an instance of a portion of a database or an instance of all of a database.

13. The system of claim 12 wherein at least some of the nodes have the same portion of the database as each other, the nodes that have the same portion of the database as each other further comprise database replication software which allows the same portions of the database to remain synchronized whenever the contents of the database at one of the nodes is changed.

14. The system of claim 13 wherein database replication software performs the synchronization using synchronous replication.

15. The system of claim 13 wherein database replication software performs the synchronization using asynchronous replication.

16. The system of claim 13 wherein database replication software performs the synchronization using dual write synchronization.

17. A split processing system comprising:
(a) a plurality of nodes, each node including one or more processors;
(b) a communication network that allows the one or more processors at each of the nodes to cooperate with each other; and
(c) means to allow one or more of the nodes to take over processing capacity of a node that becomes lost,
the availability of the split processing system being greater than the availability of an unsplit system wherein all of the processors are located at a single node,
wherein each node operates independently of each other.

18. A split processing system comprising:
(a) a plurality of nodes, each node including:
(i) a processor subsystem including at least one processor, and
(ii) an operating system;
(b) a communication network that allows the one or more processors at each of the nodes to cooperate with each other; and
(c) means to allow one or more of the nodes to take over processing capacity of a node that becomes lost,
the availability of the split processing system being greater than the availability of an unsplit system wherein all of the processors are located at a single node,
wherein each node operates independently of each other.

19. A split processing system comprising:
(a) a plurality of nodes, each node including one or more processors;
(b) a communication network that allows the one or more processors at each of the nodes to cooperate with each other; and
(c) means to allow one or more of the nodes to take over processing capacity of a node that becomes lost,
the availability of the split processing system being greater than the availability of an unsplit system wherein all of the processors are located at a single node,
wherein each node has less processors than the number of processors in an unsplit system wherein all of the processors are located at a single node.

20. A split processing system comprising:
(a) a plurality of nodes, each node including:
(i) a processor subsystem including at least one processor, and
(ii) an operating system;

(b) a communication network that allows the one or more processors at each of the nodes to cooperate with each other; and (c) means to allow one or more of the nodes to take over processing capacity of a node that becomes lost, the availability of the split processing system being greater than the availability of an unsplit system wherein all of the processors are located at a single node, wherein each node has less processors than the number of processors in an unsplit system wherein all of the processors are located at a single node.

21. A split processing system comprising:

(a) a plurality of nodes, each node including one or more processors;

(b) a communication network that allows the one or more processors at each of the nodes to cooperate with each other; and (c) means to allow one or more of the nodes to take over processing capacity of a node that becomes lost, the availability of the split processing system being greater than the availability of an unsplit system wherein all of the processors are located at a single node, wherein the split system has a specific number of failure modes which is less than the number of failure modes in an unsplit system wherein all of the processors are located at a single node.

22. The system of claim 21 wherein the number of failure modes is calculated from the number of nodes and spares of critical components.

23. A split processing system comprising:

(a) a plurality of nodes, each node including one or more processors;

(b) a communication network that allows the one or more processors at each of the nodes to cooperate with each other; and (c) means to allow one or more of the nodes to take over processing capacity of a node that becomes lost, the availability of the split processing system being greater than the availability of an unsplit system wherein all of the processors are located at a single node, wherein the split system has a specific number of failure modes which is less than the number of failure modes in an unsplit system wherein all of the processors are located at a single node.

24. The system of claim 23 wherein the number of failure modes is calculated from the number of nodes and spares of critical components.

* * * * *